United States Patent
Croxford et al.

(10) Patent No.: US 12,488,409 B2
(45) Date of Patent: *Dec. 2, 2025

(54) GRAPHICS PROCESSING

(71) Applicant: Arm Limited, Cambridge (GB)

(72) Inventors: Daren Croxford, Swaffham Prior (GB);
Mark Underwood, Cambridge (GB);
Joseph Michael Richardson,
Cambridge (GB)

(73) Assignee: Arm Limited, Cambridge (GB)

( * ) Notice: Subject to any disclaimer, the term of this patent is extended or adjusted under 35 U.S.C. 154(b) by 138 days.

This patent is subject to a terminal disclaimer.

(21) Appl. No.: 18/390,411

(22) Filed: Dec. 20, 2023

(65) Prior Publication Data

US 2025/0209562 A1    Jun. 26, 2025

(51) Int. Cl.
*G06F 15/80* (2006.01)
*G06F 9/48* (2006.01)
*G06T 1/20* (2006.01)

(52) U.S. Cl.
CPC .............. *G06T 1/20* (2013.01); *G06F 9/4881* (2013.01)

(58) Field of Classification Search
CPC ................................. G06T 1/20; G06F 9/4881
See application file for complete search history.

(56) References Cited

U.S. PATENT DOCUMENTS

| | | | |
|---|---|---|---|
| 8,400,444 B2 * | 3/2013 | Farmanbar | G06T 17/005 345/418 |
| 10,395,336 B2 * | 8/2019 | Howson | H04N 19/115 |
| 10,565,772 B2 * | 2/2020 | Howson | G06T 17/10 |
| 11,263,798 B2 * | 3/2022 | Howson | G06T 15/005 |
| 11,361,485 B2 * | 6/2022 | Uhrenholt | G06T 11/40 |
| 11,699,263 B2 * | 7/2023 | Ziegler | G06T 7/50 345/426 |
| 11,710,266 B2 * | 7/2023 | Zhang | G06T 15/005 345/522 |
| 11,983,792 B2 * | 5/2024 | Uhrenholt | G06T 1/20 |
| 12,118,642 B2 * | 10/2024 | Zhang | G06F 9/54 |
| 2013/0120410 A1 * | 5/2013 | Bakalash | G06F 9/5044 345/505 |
| 2020/0364921 A1 * | 11/2020 | Burke | G06F 9/4881 |
| 2021/0343071 A1 | 11/2021 | Clarberg | |
| 2022/0171630 A1 * | 6/2022 | Dang | G06F 9/3856 |
| 2022/0366524 A1 * | 11/2022 | Uhrenholt | G06T 1/60 |
| 2023/0196499 A1 * | 6/2023 | Kim | G06F 3/048 345/502 |

(Continued)

FOREIGN PATENT DOCUMENTS

WO    2022058012 A1    3/2022

OTHER PUBLICATIONS

Combined Search and Examination Report dated Feb. 25, 2025, GB Application No. GB2413690.5, 5 pages.

*Primary Examiner* — Cheng Yuan Tseng
(74) *Attorney, Agent, or Firm* — Pearl Cohen Zedek Latzer Baratz LLP

(57) ABSTRACT

A graphics processor and method of operating a graphics processor to perform rendering followed by post-processing, in which post-processing tasks are permitted to be issued to processing cores of the graphics processor without waiting for all of the rendering tasks to have completed their processing, such that post-processing tasks are processed concurrently with rendering tasks.

20 Claims, 12 Drawing Sheets

(56) References Cited

U.S. PATENT DOCUMENTS

| | | | |
|---|---|---|---|
| 2023/0316626 A1* | 10/2023 | Ma | G06T 15/005 |
| | | | 345/522 |
| 2024/0119662 A1* | 4/2024 | Velentzas | G06T 15/405 |
| 2024/0169619 A1* | 5/2024 | Ruud | G06T 11/40 |
| 2024/0169669 A1* | 5/2024 | Kjøll | G06T 15/40 |
| 2024/0412450 A1* | 12/2024 | Li | G06T 15/40 |
| 2025/0111577 A1* | 4/2025 | Uhrenholt | G06T 15/005 |

\* cited by examiner

GRAPHICS PROCESSING

BACKGROUND

The technology described herein relates to graphics processing, and particularly to the operation of graphics processors when performing rendering to generate a render output followed by post-processing of the render output, so as to generate a final output, e.g. frame, e.g. for display.

When performing graphics processing, a render output generated by a render pass may be subject to further processing such as de-noising or super-sampling in a "post-processing" pass, to provide a "final" output, e.g. for display.

The Applicant believes that there remains scope for improvement to this process.

BRIEF DESCRIPTION OF THE DRAWINGS

A number of embodiments of the technology described herein will now be described by way of example only and with reference to the accompanying drawings, in which:

FIGS. 5, 6, and 7 illustrate an example rendering pass α, followed by a post-processing pass β, which may be performed in the manner of the technology described herein. FIG. 5 also shows a further post-processing pass γ;

DETAILED DESCRIPTION

Figure 1:
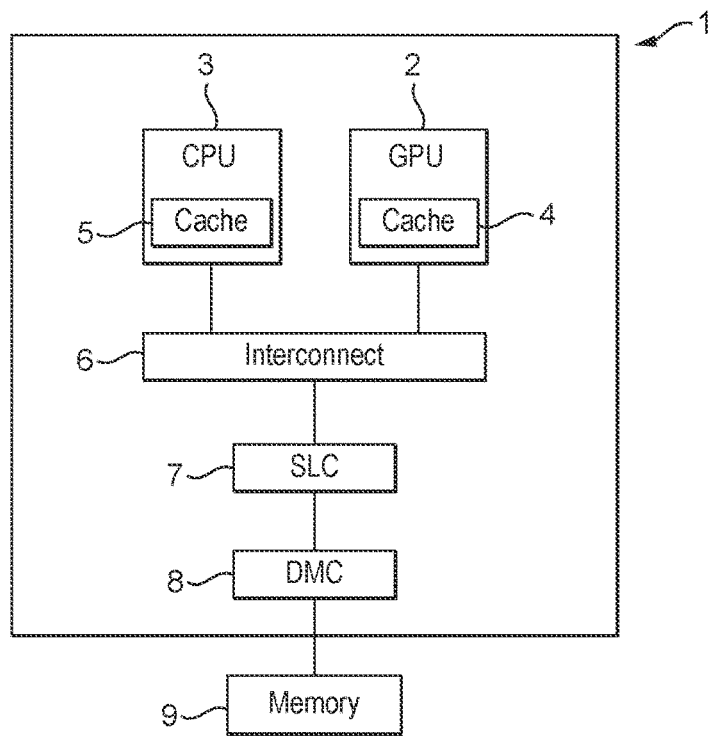
FIG. 1 shows an exemplary computer graphics processing system.

In one embodiment, the technology described herein provides a method of operating a graphics processor when performing a sequence of processing passes, the graphics processor including a set of one or more processing cores, the method comprising:

when performing a sequence of processing passes comprising a render pass and a post-processing pass, the render pass comprising a set of one or more rendering tasks to be processed to generate an overall output for the render pass, and the post-processing pass comprising a set of one or more post-processing tasks that use the overall output of the render pass:

issuing rendering tasks for the render pass to the one or more processing cores of the graphics processor for processing; and issuing post-processing tasks to the one or more processing cores of the graphics processor for processing without waiting for all of the rendering tasks for the render pass to have completed their processing, such that post-processing tasks are processed concurrently with rendering tasks.

In another embodiment, the technology described herein provides a graphics processor comprising:

a set of one or more processing cores;

a task issuing circuit operable to control the issuing of tasks to the one or more processing cores for processing; and wherein the task issuing circuit is configured to:

when the graphics processor is performing a sequence of processing passes comprising a render pass and a post-processing pass, the render pass comprising a set of one or more rendering tasks to be processed to generate an overall output for the render pass, and the post-processing pass comprising a set of one or more post-processing tasks that use the overall output of the render pass, start issuing post-processing tasks without waiting for all of the rendering tasks for the render pass to have completed their processing, such that post-processing tasks can be processed concurrently with rendering tasks.

The technology described herein concerns performing a render pass to generate an overall render output, and a post-processing pass to perform post-processing of the overall render output.

The post-processing pass may relate to any suitable and desired post-processing, for example for altering the appearance, and in an embodiment improving the quality, of the overall render output for display, for example comprising any one or more of: de-noising, super-sampling, applying one or more filters, and changing one or more properties of the image such as saturation, depth-of-field, tone mapping, HDR (High Dynamic Range). The post-processing pass could additionally or alternatively be part of post-processing for performing frame generation (generation of one or more additional output frames based (at least in part) on the render output, so as to increase the effective frame rate).

In the technology described herein, the graphics processor is controlled so as to permit post-processing tasks for the post-processing pass to be issued without waiting for all of the rendering tasks for the render pass to be completed.

In this regard, the Applicant has recognised that it is possible to start issuing (and executing) post-processing tasks (for example for generating respective regions of a post-processed output) without waiting for the entire render pass to complete. In this way the rendering tasks and post-processing tasks may be processed concurrently (e.g. interleaved), such that there is no hard (strict) processing barrier between the render pass and the post-processing pass.

The Applicant has recognised that issuing post-processing tasks without waiting for all rendering tasks to complete, as is done in the technology described herein, can help to reduce latency between the completion of rendering (to create an overall render output) and the completion of post-processing (to create an overall post-processed output, e.g. for display).

This may be of particular benefit, for example, for Extended Reality (XR) applications (comprising Augmented Reality (AR), Virtual Reality (VR), or other extended reality applications) where reducing latency for generating a post-processed output for display can help reduce sensations of dizziness for the user.

The technology described herein can also help improve hardware utilisation and processing efficiency, since processing cores of the graphics processor which have completed their rendering tasks, instead of lying idle until the overall (entire) render output is generated, can be issued with post-processing tasks to perform. This may be particularly useful when performing graphics processing on a mobile device (e.g. such as a phone, tablet, headset, wearable or other mobile device) or other device with relatively restricted processing capabilities.

Issuing post-processing tasks without waiting for all rendering tasks to have completed their processing, as is done in the technology described herein, can (and in embodiments does) permit post-processing tasks to be processed shortly after rendering task(s) on which they depend have completed their processing. This may accordingly allow post-processing tasks to access data generated by rendering tasks on which they depend from local storage (where the data may be stored at least initially), rather than having to access data from main memory, and so may reduce overall memory bandwidth consumption.

The Applicant has recognised that the technology described herein may be particularly applicable to and useful for performing post-processing comprising neural network processing (machine learning processing) by the graphics processor.

In this regard, as will be explained in more detail below, the Applicant has recognised that post-processing comprising neural network processing can be performed as a plurality of post-processing tasks (neural network processing tasks) which can be issued (and executed) independently of one another, and as and when rendering tasks on which they depend are issued and/or executed.

The Applicant has recognised that issuing of neural network processing tasks for post-processing in the manner of the technology described herein can be particularly effective since the size of the receptive field for neural network processing (e.g. corresponding to a kernel ('filter')), which determines the size of a region of the overall render output required to perform a neural network processing task (e.g. to generate a region of an output feature map), may be relatively small, so only part of (and not the entirety) of the overall render output needs to be generated before neural network processing tasks can start being issued and executed.

Accordingly, in another embodiment the technology described herein provides a method of operating a graphics processor, the graphics processor including a set of one or more processing cores, the method comprising:
when the graphics processor is performing a sequence of processing passes comprising a render pass and a neural network processing pass, the render pass comprising a set of one or more rendering tasks to be processed to generate an overall output for the render pass, and the neural network processing pass comprising a set of one or more neural network processing tasks that use the overall output of the render pass:
issuing rendering tasks for the render pass to the one or more processing cores of the graphics processor for processing; and
issuing neural network processing tasks to the one or more processing cores of the graphics processor for processing without waiting for all of the rendering tasks for the render pass to have completed their processing, such that neural network processing tasks are processed concurrently with rendering tasks.

In another embodiment the technology described herein provides a graphics processor comprising:
a set of one or more processing cores;
a task issuing circuit operable to control the issuing of rendering tasks and neural network processing tasks to the one or more processing cores for processing; and
wherein the task issuing circuit is configured to:
when the graphics processor is performing a sequence of processing passes comprising a render pass and a neural network processing pass, the render pass comprising a set of one or more rendering tasks to be processed to generate an overall output for the render pass, and the neural network processing pass comprising a set of one or more neural network processing tasks that use the results of the render pass,
start issuing neural network processing tasks without waiting for all of the rendering tasks for the render pass to have completed their processing, such that neural network processing tasks can be processed concurrently with rendering tasks.

Consistent with the above discussion, the technology described herein is concerned with controlling a graphics processor when performing graphics processing comprising rendering followed by post-processing (for example comprising neural network processing), for example to generate an overall post-processed output (e.g. image) for display. The graphics processing may be part of graphics processing for generating an extended reality (XR) output for display (for example comprising an Augmented Reality (AR), Virtual Reality (VR), or other extended reality outputs).

From a general aspect, the processing performed by a graphics processor may be performed as one or more processing passes (for example, with each processing pass producing an output, which is then used by a next processing pass). Thus, for example, rendering performed by the graphics processor may be performed using (comprise) one or more render passes, and post-processing performed by the graphics processor may be performed using (comprise) one or more post-processing passes.

The technology described herein is concerned in particular with controlling a graphics processor when performing a render pass which generates an overall render output, (e.g. frame (image)), followed by a post-processing pass which performs processing using the overall render output (frame (image)).

The render pass which generates the overall render output may be a single (sole) render pass performed by the graphics processor for performing rendering. Alternatively, (in the case of rendering comprising a sequence of plural render passes) the render pass which generates the overall render output is in an embodiment a final (last) render pass.

The rendering (render pass(es)) may comprise any suitable and desired processing for generating an overall render output (e.g. frame (image)). For example, the rendering (rendering pass(es)) may perform processing for determining the appearance of sampling positions in the overall render output (for example in terms of colour, and/or other (e.g., visual) properties).

As well as colour information (for example), the render output may comprise further information, such as depth, surface normal, albedo, specular intensity, etc. In an embodiment at least the (e.g. R, G, B) colour channels (information) are input into the post-processing, but other channels (information) may be used as well, if desired.

In embodiments, the rendering (render pass(es)) is performed by the graphics processor after performing rasterising. In such embodiments, the rendering (render pass(es)) may comprise determining the appearance of sampling positions based on non-position attributes of vertices of primitives which have been determined (in the rasterising stage) to cover the sampling positions (this rendering process may be referred to as "fragment shading").

In embodiments, the rendering (render pass(es)) alternatively or additionally comprises ray tracing, in which the appearance of sampling positions in the overall render output are determined by simulating the interaction of rays of light with objects in a scene to be displayed.

The post-processing pass which processes (uses) the overall render output (e.g. image) may be (part of) any suitable and desired post-processing that follows the rendering to generate an overall post-processed output (post-processed image), e.g. which may then be displayed to a user via a suitable display.

The post-processing in embodiments alters the appearance of the overall render output (image), and in an embodiment improves the visual quality of the render output. In such embodiments, the post-processing may comprise any one or more of: de-noising (reducing the amount of noise in the render output) (for example, ray-tracing de-noising); super-sampling (generating data for additional sampling positions, so as to increase the number of sampling positions (pixels) in the render output, thus increasing the resolution of the render output); applying one or more filters to the render output; and changing one or more properties of the render output (image) such as saturation, depth-of-field, dynamic range (e.g. HDR), tone mapping.

The post-processing in embodiments, additionally or alternatively, comprises frame generation (generating one or more additional output frames (images) based on the overall render output), so as to increase an effective rate at which frames (images) are generated by the graphics processor.

The post-processing may comprise one or more post-processing passes. Accordingly, the post-processing pass which (directly) uses (processes) the overall render output could be a single (sole) post-processing pass (and may itself generate an overall post-processed output, e.g. for display). Alternatively, the post-processing pass which (directly) uses (processes) the overall render output could be the first of a sequence of plural post-processing passes which may each generate an (intermediate) post processed output, with the final post-processing pass of the sequence generating the overall post-processed output, e.g., for display.

The post-processing may, e.g., be performed by an appropriate accelerator, and/or program executing on a processing core.

In embodiments, the post-processing performed comprises neural network processing (neural processing) (machine learning). In such embodiments, the post-processing pass may therefore be a neural network processing pass.

Neural network processing may be particularly efficient for performing post-processing comprising (and in embodiments comprises) one or more of: de-noising, super-sampling, and frame generation.

In this regard, instead of generating each and every render output (image) as it is ultimately desired to be displayed, it may be more efficient to generate a render output which is then processed (improved) using post-processing comprising neural network processing which can operate quickly compared to rendering at a higher quality. For example, a render output which is noisy (e.g. generated using ray tracing with relatively few rays) can then be de-noised using neural network processing, and/or a render output which has relatively few sampling positions (is low resolution) can then be super-sampled using neural network processing, and/or render output(s) can be generated at a relatively low frame rate with additional frames (images) then generated using neural network processing.

The neural network processing for the post-processing maybe any suitable and desired type of neural network processing. Neural network processing may comprise one or more layers of neural network processing, which may operate in sequence, so that the output from a layer is used as the input for a next layer in the sequence. A (each) layer of neural network processing may be performed as a post-processing pass (neural network processing pass).

In embodiments, the post-processing pass (neural network processing pass) which (directly) uses the overall render output (which follows the render pass) (for which tasks are permitted to be issued before all of the rendering tasks have completed their processing) in an embodiment comprises a layer of neural network processing, in an embodiment a first layer of neural network processing in a sequence of layers of neural network processing to be performed.

If the neural network processing consists of a single layer only, then the single (first) layer of neural network processing could generate the overall post-processed output (post-processed image, e.g., for display). Alternatively, when the neural network processing comprises a sequence of plural layers of neural network processing, then the final layer of neural network processing may generate the overall post-processed output (post-processed image, e.g., for display) (with any earlier layers, including the first layer and any intermediate layers, generating (intermediate) post-processed outputs, for example, output feature maps). In either case, the neural network processing as a whole may ultimately generate the overall post-processed output (post-processed image, e.g. for display).

Each neural network processing layer may be any suitable and desired type of neural network processing layer, for example comprising any of: a convolution layer, a pooling layer, an activation layer, a fully connected layer, or other suitable and desired neural network layer. In an embodiment the first layer of neural processing (which (directly) uses the overall render output) is a convolution layer.

In the technology described herein, the work (processing) required for a processing pass is divided into (comprises) plural "tasks", which when executed each perform part of the processing required for the processing pass, and in an embodiment which together (in total) perform all of the processing required for the processing pass.

The Applicant has recognised that, when a rendering pass and a post-processing pass are divided into (and processed as) a set of one or more "tasks", the efficiency of rendering and post-processing may be improved by permitting tasks for a post-processing pass to be issued without waiting for all of the rendering tasks to have completed their processing.

Thus, in the technology described herein, the rendering pass which generates the overall render output comprises (is divided into, and is processed as) a set of one or more rendering tasks. Each rendering task (when executed) performs processing which generates part of the overall render output (frame (image)), in an embodiment a respective region of the overall render output.

In an embodiment each rendering task (when executed) generates a different, in an embodiment non-overlapping, region of the overall render output. The region generated by each rendering task is in an embodiment a contiguous region of the overall render output. The regions may be the same size and shape, in an embodiment being rectangular, in an embodiment square.

Each region generated by a rendering task may be two-dimensional (extending in the x and y directions), for example when the overall render output comprises a single two-dimensional image. Alternatively, each region generated by a rendering task could be three-dimensional (extending in the x, y and z directions), for example when the overall render output is three dimensional, for example comprising plural two-dimensional images generated simultaneously, such that the z direction corresponds to the depth (image number) within the plural images.

In embodiments, the graphics processor is configured to perform (and performs) tile-based processing (tile-based rendering) in which the overall render output is generated as a plurality of "tiles" (sub-regions) which are processed (rendered) separately. In this case, the region of the overall render output which each rendering task generates in an embodiment corresponds to a respective, non-overlapping "tile" of the overall render output. Each tile may be regularly-sized and shaped (e.g. being a rectangle, or square). Each tile in an embodiment corresponds to an array of contiguous sampling positions, for example each tile being 16×16 or 32×32 or 64×64 sampling positions in size.

In embodiments (for example for rendering tasks which generate different, non-overlapping regions, e.g. tiles, of the overall render output), each rendering task for the render pass does not depend on (the completion of) any of the other rendering tasks for the render pass. In such embodiments, the rendering tasks can be performed (executed) independently of one another. Accordingly, the rendering tasks may be issued (e.g. issued to processing core(s) of the graphics processor, by a task issuing circuit) (and executed) in any suitable and desired order compared to one another. Different rendering tasks may be issued to different processing cores if desired, so that rendering tasks are performed in parallel across plural of the processing cores.

The post-processing pass which uses the overall render output generated by the render pass, in accordance with the technology described herein, comprises (is divided into, and is processed as) a set of one or more post-processing tasks which when executed cause post-processing (post-processing operation(s)) to be performed.

As discussed above, in embodiments, the post-processing pass which uses the overall render output generated by the render pass performs neural network processing (is a neural network processing pass, for example comprising a layer of neural network processing). In such embodiments, the post-processing tasks when performed (executed) cause neural network processing to be performed (are neural network processing tasks).

The post-processing task(s) for the post-processing pass may each (when executed) perform processing which generates part of a post-processed output for the post-processing pass (for example, generating part of an output feature map, in the case of a post-processing pass which comprises neural network processing).

In an embodiment each post-processing task (when executed) generates a different, in an embodiment non-overlapping, in an embodiment contiguous region (tile) of the post-processed output (e.g. contiguous data elements in a data array which forms an output feature map, in the case of a neural network processing task). The regions generated by respective post-processing tasks may be the same size and shape, for example being rectangular or square. Each region generated by a post-processing task may be two-dimensional (extending in the x and y directions), or three-dimensional (extending in the x, y and z directions, the z direction corresponding to a depth (number of images, or number of 'channels' in the case of neural network processing)). The regions generated could have a dimensionality higher than three if desired.

A (each) post-processing task could generate a region (tile) of the post-processed output which is the same size (comprises, in the x, y and optionally z direction, the same number of sampling positions (data elements)) as a region (tile) of the overall render output generated by a rendering task of the render pass. However, this is not essential, and region(s) of the post-processed output generated by post-processing task(s) could differ in size compared to region(s) of the render output generated by the rendering tasks for the preceding render pass.

As noted above, the post-processing pass which follows the render pass performs processing of (uses) the overall render output generated by the render pass. In an embodiment, each post-processing task of that post-processing pass uses (processes) a respective region of the overall render output.

The region of the overall render output used by a (each) post-processing task in an embodiment comprises a contiguous region of the overall render output, such as a rectangular region or a square region.

The region of the render output used by a (each) post-processing task could correspond (exactly) to a region (tile) of the overall render output generated by a (respective) rendering task, and in embodiments this is done.

However, in embodiments, a region of the overall render output used by a (any) post-processing task may be permitted to (and does) differ from region(s) generated by rendering task(s), for example being a different size compared to region(s) generated by the rendering task(s) and/or having a different position within the overall render output compared to region(s) generated by the rendering task(s). For example, each post-processing task comprising neural network processing may use a region of the overall render output corresponding to 27×27 sampling positions.

In this regard, post-processing task(s) may perform processing at a different resolution compared to rendering task(s), using regions of the overall render output which differ in size compared to the regions of the overall render output generated by respective rendering tasks.

For example, a region of the overall render output used by a post-processing task may be permitted to (and) comprise (span) only part of (less than the whole of) a region generated by a rendering task. A region of the overall render output used by a post-processing task may alternatively or additionally be permitted to (and) comprise (span) the whole of a region generated by a rendering task.

In embodiments, a post-processing task may be permitted to (and) use a region of the overall render output which comprises (spans) one or more (a single or plural) regions (in an embodiment adjacent regions) generated by rendering respective tasks, either entirely (wholly) or partially (in part).

It would be possible for a post-processing task to generate (to be required to generate) a region of the post-processing output which is the same size as the region of the overall render output which it uses (as may be the case, for example for post-processing which comprises applying a filter). Alternatively, and in an embodiment, a post-processing task may generate (is permitted to generate) a region of the post-processed output which is different in size (comprises a different number of sampling positions) compared to the region of the overall render output which it uses (as may be the case for example when performing super-sampling, or when performing neural network processing).

For example, when performing post-processing comprising neural network processing, it may be the case that data from multiple sampling positions (pixels) of the render output (corresponding to a receptive field or "filter" of a neural network layer) are needed to generate data for a single sampling position (data element) of the post-processed output (output feature map). As such, the region of the render output used by a post-processing task which performs neural network processing may be larger than the region of post-processed output generated by the post-processing task.

In embodiments, a post-processing task which performs neural network processing may use a region of the overall render output which comprises (spans) one or regions (tiles) generated by respective rendering tasks (which may map to (correspond to) the region of the post-processed output to be generated by the post-processing task), and which additionally comprises at least part of one or more neighbouring ('boundary') regions (tiles) of the render output generated by rendering task (to thereby allow for the receptive field required for the neural network processing).

In an embodiment, each post-processing task uses a different region of the overall render output. The regions of the overall render output used by respective different post-processing tasks could be non-overlapping, or alternatively may be permitted to (and in embodiments do) at least partially overlap (as may be the case for post-processing tasks which perform neural network processing).

The post-processing (operation) performed could differ between post-processing tasks of the post-processing pass (e.g. so that different post-processing is performed on different regions of the overall render output).

The post-processing to be performed by different post-processing tasks (e.g. on different regions of the overall render output) could be chosen and configured in any suitable and desired way, for example to cause different regions of the overall render output to be altered visually in different ways (e.g. apply different amounts of denoising, different amounts of upscaling, different filters, or other suitable and desired differences).

Alternatively, and in embodiments, the post-processing (operation) performed is the same for each of the post-processing tasks of the post-processing pass.

In embodiments (for example, for post-processing tasks which generate different, non-overlapping regions, of the post-processed output), each post-processing task does not depend on (the completion of) any of the other post-processing tasks for the post-processing pass. In such embodiments, the post-processing tasks of a post-processing pass can be performed (executed) independently of one another. In this case, the post-processing tasks of a post-processing pass may be issued (e.g. issued to processing core(s) of the graphics processor, by a task issuing circuit) (and executed) in any suitable and desired order compared to one another. Different post-processing tasks can be issued to different processing cores if desired, so that post-processing tasks are performed in parallel across plural of the processing cores.

However, since the post-processing pass uses (processes) the overall render output from the render pass, the post-processing task(s) in embodiments depend on (the completion of) rendering task(s).

Thus, in embodiments, a (each) post-processing task of the post-processing pass which follows the render pass depends on (the completion of) (a set of) one or more rendering tasks.

The rendering task(s) which a post-processing task depends on may (and in an embodiment do) comprise the rendering task(s) that (when executed) generate the region of the render output used by the post-processing task.

Thus, whilst the Applicant has recognised that post-processing tasks can be (and in the technology described herein are permitted to be) issued to processing core(s) without waiting for all of the rendering tasks for the render pass to have completed their processing (execution), it may be the case that a given post-processing task cannot be performed (executed) by the processing core(s) until the rendering task(s) on which it depends have completed their processing (execution).

Which rendering task(s) a (each) processing task depends on may be predictable (known, e.g. pre-determined) in advance of commencing the render pass and post-processing pass (in advance of issuing any rendering and post-processing tasks).

For example, rendering tasks of the render pass may generate (output) regions according to a known (pre-determined) configuration of tiles (e.g. tiles being a particular size and shape).

Post-processing tasks may likewise use (input) regions of the render output which are known (can be determined) (e.g. being of a particular size and shape). This may be the case, for example, for post-processing comprising neural network processing (for example, in which a weight data array (filter) is applied to the overall render output in according to a pre-determined pattern (stride)). Other types of post-processing (for example any of those described herein) may also have dependencies upon rendering tasks which are predictable (known, e.g. pre-determined).

The graphics processor, in the technology described herein, is operated so that post-processing task(s) are issued to processing core(s) (by a task issuing circuit) without waiting for all of the rendering tasks for the render pass to have completed their processing.

In embodiments, the order in which tasks are issued and/or the processing core(s) to which they are issued is controlled (selected) based on the dependencies of post-processing tasks on rendering tasks. The Applicant has found that this can help with efficiently performing the rendering and post-processing (as will be discussed in more detail below).

For example, due to the dependencies between rendering tasks and post-processing tasks, it may be desirable to control the order of issuing of rendering tasks based on the order of issuing of post-processing tasks and vice versa. This may allow rendering tasks to be issued in an order which efficiently 'feeds' the post-processing tasks, and for post-processing tasks to be issued in an order which efficiently uses the regions of the overall render output generated by rendering tasks.

Thus, in embodiments, the order in which post-processing tasks are issued is controlled (determined) (at least in part) based on the order in which rendering tasks (on which they depend) are (or are to be) issued. Additionally or alternatively, in embodiments the order in which rendering tasks are issued is controlled (determined) (at least in part) based on the order in which post-processing tasks (which depend on them) are (or are to be) issued.

For example, an order for issuing rendering tasks may be selected (chosen), and an order for issuing post-processing tasks then determined based on the selected order for the rendering tasks. Alternatively, an order for issuing post-processing tasks could be selected (chosen) and an order for issuing rendering tasks then determined based on the selected order for the post-processing tasks. Alternatively, an order for issuing rendering tasks and an order for issuing post-processing tasks could both be selected (chosen) at the same time.

In embodiments, the order of issuing rendering tasks (relative to one another) is controlled (selected) based on the dependencies of post-processing tasks upon the rendering tasks.

In this regard, the Applicant has recognised that it may be desirable to control the order of issuing of rendering tasks to generate regions of the overall render output in an order which efficiently 'feeds' the post-processing tasks of the post-processing pass.

Thus, in embodiments, rendering tasks are issued in an order which prioritises grouping (preferentially groups) rendering tasks that form the (set of) one more rendering tasks on which a post-processing task depends. In other words, rendering tasks are, in embodiments, issued in an order in which prioritises grouping rendering tasks on which respective post-processing tasks depend.

In embodiments, rendering tasks are issued in an order which prioritises successively issuing rendering tasks on which a (respective) post-processing task depends (so that the rendering task(s) on which a post-processing task depends are preferentially issued successively (immediately after one another)).

Additionally or alternatively, rendering tasks could be (and in embodiments are) issued in an order in which rendering task(s) on which a post-processing task depends are (prioritised to be) issued in close proximity to one another, but may be (are permitted to be) interleaved with one or more other rendering tasks and/or post-processing tasks (e.g. with the rendering tasks on which a post-processing task depends being spaced apart by up to 1, 2, 3 or n tasks, where n is an integer for having a particular, in an embodiment selected, in an embodiment predetermined, value).

Thus, in embodiments, for at least some of the post-processing tasks, the rendering tasks on which they depend are issued successively or within close proximity to one another (in the order of rendering tasks).

In this way, when rendering tasks are issued (to processing core(s)) and processed (executed) (by the processing core(s)), they may generate render output data required by a (each respective) post-processing task within a relatively short timeframe. In this way it may be relatively likely that the render output data required by a post-processing task will still be present in local memory when the post-processing task is performed (by the processing core to which it has been issued), thus reducing the need for data to be read from main, off-chip, memory.

In embodiments (as discussed above), a (each) post-processing task may process (require) a region of the overall render output corresponding to one or more adjacent regions of the overall render output generated by rendering tasks (for example, as may be the case for post-processing comprising neural network processing). In such embodiments, rendering tasks may be issued so that successive rendering tasks (in the order of rendering tasks) (tend to) generate adjacent regions of the overall render output.

In an embodiment, the rendering tasks are issued such that (at least some) successive rendering tasks (in the order of rendering tasks) together generate an array of n×m respective regions of the overall render output (corresponding to a region of the overall render output required by a post-processing task). This could be (and is in embodiments) done by issuing rendering tasks according to a Morton order (Z order) or Hilbert order, or other suitable and desired space filling order.

It may be the case that different post-processing tasks depend on a different number of rendering tasks. For example, it may be the case that a post-processing task using a region over the overall render output which is at an edge of the overall render output requires a smaller region (depends on fewer rendering tasks) than a post-processing task which uses a region of the overall render output that is positioned away from the edges of the overall render output (since a 'boundary' region may not be needed at the edge of the render output for the post-processing task).

In embodiments, rendering tasks may (therefore) be issued in an order which prioritizes generation of (initially generates) render output regions at an edge (at one or more edges) of the render output (before generating output regions away from the edges of the overall render output). This which may accordingly allow post-processing tasks having relatively few dependencies to be issued and/or processed before post-processing tasks having a greater number of dependencies.

From a broader perspective, in embodiments where post-processing tasks depend on a group (set) of one or more rendering tasks which may vary in size among post-processing tasks, rendering tasks may be issued in an order in which rendering tasks corresponding to smaller groups (sets) of rendering tasks on which post-processing tasks depend are (generally) issued before rendering tasks corresponding to larger groups (sets) of rendering tasks on which post-processing tasks depend.

In embodiments, the order in which rendering tasks for the render pass are issued (relative to one another) is predetermined (determined prior to commencing the render pass (prior to issuing any rendering tasks for the render pass)), and is in an embodiment static (remains unchanged throughout the render pass).

In this regard, the dependencies of post-processing tasks upon rendering tasks may be predictable (known, e.g. predetermined) in advance of commencing the render pass and post-processing pass (in advance of issuing any rendering and post-processing tasks). Accordingly, an order for issuing rendering tasks that takes account of dependencies of post-processing tasks can be determined in advance of commencing the render pass and post-processing pass.

However, it is noted that, when rendering tasks are issued in a static (predetermined) order, they may still complete their processing (execution) out-of-order (for example, since processing cores may take longer to process (execute) more complex tasks, so that less complex tasks which are issued later but are faster to process may complete ahead of slower, more complex, tasks which were issued earlier).

If desired, the order in which rendering tasks are issued could instead be determined dynamically (e.g. changed compared to an initially determined order, or determined entirely on-the-fly) whilst performing the render pass and post-processing pass. This could be done, for example, to optimise execution (e.g. re-distribute the processing burden) of tasks on the processing cores of the graphics processor.

In the technology described herein, post-processing tasks are permitted to be issued before all of the rendering tasks (of the rendering pass which generates the overall render output) have completed their processing, so that rendering tasks and post-processing tasks can be processed concurrently. In embodiments, the order in which tasks are issued is controlled so as to permit interleaving of (and to interleave) post-processing tasks with the rendering tasks.

In embodiments, the issuing of post-processing tasks (the order of issuing post-processing tasks relative to rendering tasks) is controlled based on the dependencies of post-processing tasks upon the rendering tasks.

In embodiments, a (each) post-processing task is issued (permitted to be issued) (only) after all of the rendering task(s) on which it depends have been issued. In embodiments a (each) processing task is issued (permitted to be issued) (only) after all of the rendering task(s) on which it depends have (or are likely to (expected to) have) completed their processing (execution). Such control may help to avoid post-processing tasks that have been issued to processing core(s) then having to wait for their dependencies to be met before they can be processed (executed), which may otherwise cause the processing core(s) to be idle.

In embodiments, a (each) post-processing task is (prioritised to be) issued shortly after (once) the rendering task(s) on which it depends have (or are likely (expected) to have) completed their processing. This may allow data generated by rendering task(s) to be obtained from local (on-chip) storage (where the data may be stored at least initially) when performing post-processing tasks, rather than having to access data from main memory, and so may reduce overall memory bandwidth consumption.

In embodiments, an (initial) (predetermined) order for issuing post-processing tasks (relative to one another and/or relative to the rendering tasks) is determined in advance of performing the rendering pass and post-processing pass (in advance of issuing any tasks for the rendering pass and post-processing pass).

(Thus), in embodiments, an (initial) (predetermined) order of issuing post-processing tasks relative to rendering tasks is determined, which in embodiments remains unchanged (is static) during issuing of rendering tasks and post-processing tasks.

Using an unchanged (static) predetermined order for issuing post-processing tasks relative to rendering tasks may be appropriate, for example, when rendering tasks take a predictable amount of time to complete their processing. In this case (and in embodiments), a (each) post-processing task can be (is) included in the task issuing order at an appropriate point by which the rendering tasks on which it depends are likely to (predicted to) have completed their processing (execution).

This could be done, for example, by including a post-processing task in the task issuing order shortly after (for example in a particular (set) position after) the rendering tasks (the last rendering task) on which it depends (e.g. as the next task after, or as the next-but-one task after, or up to the nth task after (where n is an integer having a particular, in an embodiment selected, in an embodiment predetermined value)). In this regard, an appropriate delay in the issuing of the post-processing task after the rendering task(s) on which it depends may allow time for those rendering task(s) to complete their processing (execution) before the post-processing task is to be processed (executed).

However, it may be the case that the amount of time that rendering tasks take to complete their processing is not (easily) predictable (e.g. if some rendering tasks take longer to complete their processing than others). There may (also) be scenarios where it is not computationally efficient to calculate in advance an order of post-processing tasks relative to rendering tasks.

In this regard, the Applicant has recognised that (instead of issuing post-processing tasks based on when rendering tasks are expected (predicted) to complete their processing, so that rendering tasks are issued according to a static predetermined order compared to rendering tasks), it may be desirable to control the issuing of post-processing tasks based on when rendering tasks actually complete their processing (execution).

Accordingly, in embodiments a (each) post-processing task is issued (permitted to be issued) based on determining (when it is determined) that one or more (or in an embodiment all) of the rendering tasks on which it depends have (actually) completed their processing. Accordingly, in embodiments, a (each) post-processing task is not issued until it has been determined that one or more (or in an embodiment all) of the rendering tasks on which it depends have completed their processing.

Whether rendering task(s) have completed their processing may be determined (monitored) (tracked) in any suitable and desired way (example embodiments for which will be discussed in further detail below).

Thus, in embodiments, the completion of processing (execution) of rendering tasks is monitored (tracked), and post-processing tasks are issued based on the monitoring (tracking) of (the completion of) rendering tasks.

In embodiments, issuing of post-processing tasks based on whether the rendering tasks on which they depend have (actually) completed their processing (based on tracking of completion of rendering tasks), comprises issuing post-processing tasks in a predetermined (initial, static) order relative to one another. In this case, the post-processing tasks may be considered, in turn, in the predetermined order, with each post-processing task being issued (in turn, in the pre-determined order) once it is determined that the rendering tasks on which it depends have completed their processing (execution).

In this regard, the post-processing pass may start by considering a first post-processing task to be issued (in the predetermined order for post-processing tasks), and issuing that first post-processing task when it is determined that the rendering task(s) on which it depends have completed their processing, and then considering a second (next) post-processing task in the predetermined order for post-processing tasks, and issuing that second post-processing task when it is determined that rendering task(s) on which it depends have completed their processing, and so on, with the post-processing tasks being considered and issued according to the predetermined order.

Alternatively, in embodiments, issuing post-processing tasks based on whether the rendering tasks on which they depend have (actually) completed their processing (based on tracking of completion of rendering tasks), comprises (dynamically) determining the order in which post-processing tasks are issued relative to one another during the rendering pass and post-processing pass.

Dynamically determining the order for post-processing tasks could be done by adjusting an (initial) predetermined order (which has been determined prior to commencing the rendering pass and the post-processing pass). This could be (and in embodiments is) done by considering post-processing tasks in turn in the initial order, and if (when) the rendering tasks on which a post-processing task depends have not yet completed their processing, then considering whether to issue a next post-processing task in the order (before the earlier post-processing task). In other words, if it is determined that the rendering tasks on which a post-processing task depends are have not completed their processing (execution), then that post-processing task is deemed to be not (yet) ready to be issued (and is not issued (is skipped)).

A post-processing tasks which is not ready to be issued may be re-considered (re-tried) for issuing in any suitable and desired manner, for example, in response to determining that the rendering task(s) on tasks which it depends have completed their processing (for example, by using the completion of processing (execution) of a (each) rendering task to trigger a check for any post-processing task(s) which can be issued as a result of the rendering task completing its processing).

Alternatively, post-processing tasks which are not ready to be issued could be considered again, for example, after the entire (initial) predetermined order for the set of post-processing tasks has been traversed, or for example periodically after one or more (for example a pre-determined number of) other post-processing tasks which are later in the (initial) predetermined order have been considered.

In the above embodiments, the initial (predefined) order for post-processing tasks relative to one another could be any suitable and desired order. For example, for post-processing tasks which generate respective regions of the post-processed output, the post-processing tasks could be issued so post-processing tasks are considered in an order which generates regions of the post-processing output row-by-row, column-by-column, or according to a more complex space-filing order (e.g. a Z or Morton order).

Alternatively, the initial (predefined) order for post-processing tasks relative to one another could be (and in embodiments is) based on a (predetermined) order in which rendering tasks are to be issued, in an embodiment with the post-processing tasks being ordered so that respective post-processing tasks are (likely to be) considered for issuing after the rendering tasks on which they depend are issued and/or have completed their processing.

Alternatively, determining the order for post-processing tasks could be done dynamically (and completely) on-the-fly during the rendering and post-processing passes. This could be (and is in embodiments) done by, in response to a (each) rendering task completing its processing, determining (identifying) whether any post-processing tasks are able to be issued (whether all of the rendering tasks on which they depend have completed their processing), and then issuing those determined (identified) post-processing task(s)). In other words, in embodiments, the completion of processing (execution) of a (each) rendering task may be used to trigger a check for any post-processing task(s) which can be issued as a result of the rendering task completing its processing.

In any of the above embodiments in which post-processing tasks are issued based on tracking of completion of rendering tasks, a (each) post-processing task is in embodiments (individually) issued immediately (without delay) (e.g. as the next task to be issued) in response to determining that the rendering task(s) on which it depends have (actually) completed their processing. This may improve the chance that data generated by those rendering tasks will still be present in, and can be re-used from, local memory when performing (executing) the post-processing task.

Alternatively, it would be possible to issue post-processing tasks in batches (as plural post-processing tasks as at a time), for example in response to determining that the rendering tasks on which a batch of post-processing tasks depend have completed their processing.

As discussed above, in embodiments, a (each) post-processing task is issued to a processing core (only) once it is determined that the rendering task(s) on which it depends have (actually) completed their processing (execution).

Accordingly, in embodiments, whether rendering task(s) have actually completed is monitored (tracked), and used to control the issuing of post-processing tasks.

The completion of processing of rendering task(s) could be monitored (tracked) in any suitable and desired way. For example, and in embodiments, the completion of processing of rendering task(s) is tracked using a data structure indicating a completion status of rendering tasks (a 'task completion status' data structure for the render pass), which is in an embodiment updated as and when the rendering tasks for the render pass complete their processing.

A rendering task may be determined to have 'completed' its processing in response to any suitable and desired indication of the processing (execution) of the rendering tasks being complete. For example, a rendering task may be considered to be 'complete' once the output data (e.g. for a region of the render output) associated with the rendering task has been generated, and in an embodiment written to storage (e.g. the tile buffer). Thus, in embodiments, a task complete status is signalled and used to update the 'task completion status' data structure once (and in an embodiment as soon as) a rendering task has finished its processing and stored its output data.

The 'task completion status' data structure for the render pass may take any suitable and desired form. In embodiments, the 'task completion status' data structure comprises a plurality of indicators (trackers) (forming a "scoreboard" of indicators), each indicating whether a respective rendering task (or respective group of rendering tasks) of the render pass have completed their processing.

Since rendering tasks in embodiments generate render output data for different respective regions of the render output, the indicators of the 'task completion status' data structure may (do) correspond to different respective regions of the render output (and indicate whether those respective regions of the render output have been generated).

In embodiments, the 'task completion status' data structure comprises a respective indicator for each rendering task (for each output region (tile) of the overall render output to be generated by a rendering task) of the render pass, such that there is a one-to-one correspondence between indicators in the 'task completion status' data structure and the rendering tasks.

However, storing a respective indicator for each rendering task may require a relatively large area for storing the 'task completion status' data structure. For example, when performing tile-based rendering where each rendering task corresponds to (generates a region of the overall render output corresponding to) a respective rendering tile, and in which the overall render output is subdivided into a 64×64 array of rendering tiles, the 'task completion status' data structure would need to store a respective 4096 separate indicators.

Thus, in some embodiments, a (each) indicator of the 'task completion status' data structure represents a respective group of one or more (in an embodiment plural) (but less than all of the) rendering tasks for the render pass. In other words, a (each) indicator may represent a region of the render output generated (to be generated) by a group of one or more rendering tasks. In such embodiments, each indicator indicates whether the rendering task(s) it represents have completed their processing.

The group of rendering tasks represented by a (each) indicator of the 'task completion status' data structure is in an embodiment a group of rendering tasks which generate adjacent regions (tiles) of the overall render output. In other words, a (each) indicator in an embodiment represents a contiguous region of the overall render output to be generated, spanning one or more tiles of the overall render output.

Thus, group of rendering tasks represented by a (each) indicator of the 'task completion status' data structure could comprise, for example, groups of 4×4, 8×8, 16×16, etc., rendering tasks.

In embodiments where a (each) indicator of the 'task completion status' data structure represents a group of rendering tasks, these indicators may take any suitable and desired form. For example, each indicator may be a binary indicator in the task completion status' data structure indicating whether or not the entire group of rendering tasks represented by the indicator have completed their processing. Alternatively, and in embodiments, each indicator for a group of rendering tasks comprises a respective counter, which tracks the number of in-flight rendering tasks for the group (such that the counter is decremented as and when rendering tasks complete). In that case, once the counter reaches zero, this may indicate that all of the rendering tasks represented by the indicator have completed.

In one embodiment, the "task completion status" data structure tracks the completion of rendering tasks that are "in-flight" (rather than tracking the completion of all rendering tasks for the render pass). In this case, for example, the regions that are currently being processed by rendering tasks (and their respective positions) would be tracked, and the list of rendering task regions that are currently being processed would then be checked to determine whether there is currently a rendering task "in-flight" that a post-processing task depends on (with the post-processing task then, e.g., being permitted to proceed or not, accordingly). This arrangement would be particularly applicable where there will only be a subset of rendering tasks in-flight at any one time and the issue order of the rendering tasks is known. Thus in this case, the rendering tasks that are currently in-flight (being processed) would be tracked, together with the point (position) reached in the rendering task issue order. It can then be determined whether a particular rendering task has yet to be issued or is still in-flight. This will then allow it to be determined whether any rendering task that a post-processing task depends on is still to be completed (such that any post-processing task that depends on that rendering task should not yet proceed) or not.

Where appropriate, the task completion status data structure (however the task completion status is being tracked) may be a fixed size buffer that is, where appropriate, e.g., sized to cope with the largest resolution frame. In this case, if a frame is rendered at a lower resolution, then only a portion of the task completion status data structure may be used, and so when using such a task completion status data structure, the appropriate portion of that data structure will be analysed and used for determining when post-processing tasks can proceed, for example.

In the case where tasks "in-flight" are tracked, then there may be a maximum number of tasks that can be in-flight (determined, e.g., by the number of tasks a processing core can accept concurrently and the number of processing cores). In this case, the task completion status data structure may be sized accordingly (and store, e.g., the (x/y) position of in-flight tasks, together with, e.g., an identifier for the job/processing pass in question (to disambiguate tasks from different jobs/passes)).

The 'task completion status' data structure for the render pass (in whatever particular form the 'task completion status' data structure takes) can thus be (and is) updated as and when rendering tasks for the render pass are completed. The updating of the 'task completion status' data structure can be triggered in any suitable and desired manner. For example, and in an embodiment, the 'task completion status' data structure is updated in respect of a particular rendering task when the (final) output associated with the rendering task (for example the region of the overall render output for the rendering task) is generated and written out (as discussed above). Thus, in embodiments, whenever a rendering task for the render pass completes its processing, with the (final) output of the rendering task being written out, this can be (and in an embodiment is) signalled to cause an update of the 'task completion status' data structure. The indicator(s) encompassing that rendering task can then be updated accordingly based on the rendering task completing its processing.

The 'task completion status' data structure may generally be stored in any suitable and desired manner (provided it can be checked during the graphics processing operation). In embodiments, the 'task completion status' data structure is stored locally to (in on-chip storage of) the graphics processor, for example accessible to the task issuing circuit of the graphics processor that is operable to control the issuing of the rendering tasks and post-processing tasks to the processing core(s) of the graphics processor. In embodiments, when a rendering task completes its processing, this is signalled to the task issuing circuit which updates the 'task completion status' data structure.

The 'task completion status' data structure for the render pass (in whatever particular form the 'task completion status' data structure takes), in embodiments is checked when determining whether the rendering task(s) on which a post-processing task (or group of post-processing tasks) depends have completed, so as to determine whether to issue the post-processing task (or group of post-processing tasks).

In other words, in embodiments, the 'task completion status' data structure is checked before issuing a (in an embodiment each) post-processing task.

In embodiments, the indicator(s) relevant to a post-processing task are checked (by the task issuing circuit) before the post-processing task is (permitted to be) issued, and the post-processing tasks is only issued once (all of) the relevant indictor(s) indicate that their rendering tasks have completed processing (execution).

The indicator(s) which are relevant to a post-processing task (and which should be checked) may be determined (by the task issuing circuit) in any suitable and desired way.

For example, information indicating a mapping between post-processing tasks and relevant indicator(s) could be stored, and consulted (by the task issuing circuit) when identifying which indicator(s) of the 'task completion status' data structure to check for issuing a post-processing task. This could be done, for example, by indicating a mapping of each post-processing task to the rendering task(s) on which it depends, and indicating a mapping of each rendering task to the indicator(s) of the 'task completion status' data structure which it is represented by.

Alternatively, and in embodiments, which indicator(s) are relevant to a post-processing task (and should be checked before issuing the post-processing task) could be determined (by the task issuing circuit, for example by a scaling circuit (scaler) of the task issuing circuit) by comparing the region of the overall render output to be used by a post-processing task against the region(s) of the overall render output represented by the respective indicators of the task completion status' data structure.

In such embodiments, each post-processing task may (itself) indicate the region of the overall render output which it is to use (process). Information may also be provided (e.g. stored locally, within the graphics processor, accessible to the task issuing circuit) indicating which region of the overall render output is represented by each indicator of the 'task completion status' data structure.

Thus, in embodiments, when a post-processing task is to be issued, the region of the overall render output which is to be used by the post-processing task is identified (by the task issuing circuit), the indicator(s) of the 'task completion status' data structure relating to that region of the overall render output are identified (by the task issuing circuit), and those indicator(s) are checked to determine whether the post-processing task can be issued.

It is possible that some regions of the overall render output do not require rendering to be performed (e.g. corresponding to tiles containing no geometry). In such scenarios, the 'task completion status' data structure (scoreboard) could be set (pre-populated) (e.g. in advance of issuing any rending tasks and/or post-processing tasks) to indicate region(s) for which no rendering is to be performed, for example by setting the respective indicator(s) for those region(s) to indicate (upfront) that rendering is complete.

Alternatively, in such scenarios where some regions (tiles) of the overall render output do not required rendering to be performed, this could be indicated by a separate data structure (for example a 'tile enable map'), which is for example checked (by the task issuing circuit) when determining whether a post-processing task should be issued (so that, when the 'tile enable map' indicates that a region does not require rendering to be performed, the post-processing task is permitted to be issued, regardless of the status of any indicator(s) for that region in the 'task completion status' data structure).

It may be the case that when performing 'conventional' rendering and post-processing (in which rendering is performed in its entirety before performing any post-processing), the results from rendering are written directly (from the processing core(s), e.g. from a level 1 cache, e.g. a tile buffer of a processing core) to memory external to the graphics processor (e.g. main (off-chip) memory). In such cases, when performing later post-processing, the overall render output must then be loaded from memory for processing.

However, the Applicant has recognised that, when issuing post-processing tasks without waiting for all of the rendering tasks for a rendering pass to have completed their processing (as is done in the technology described herein), the post-processing tasks may be issued soon enough after the rendering task(s) on which they depend to justify storing (caching) regions of the overall render output generated by respective rendering tasks in local, on-chip, storage of the graphics processor (since that data is likely to be used post-processing tasks relatively soon).

(Thus) in embodiments (when operating in the manner of the technology described herein), regions of the overall render output generated by respective rendering tasks are stored (cached) in local (on-chip) storage of (accessible to) the graphics processor, for use by (subsequently issued) post-processing tasks. Thus, in embodiments, the contents of the level 1 cache (e.g. tile buffer) of the processing core(s) are cached (marked as cacheable) into local (on-chip) storage.

In embodiments, the regions of the overall render output generated by respective rendering tasks are stored in (cached into) storage integrated within the graphics processor, e.g. a level 2 cache. However, they could additionally or alternatively be stored in (cached into) any suitable and desired (on-chip) storage accessible to the graphics processor, e.g. a level 3 cache shared between the graphics processor and the host processor.

The result of (region of the render output generated by) a (each) rendering task may be stored in the local (on-chip) storage (e.g. level 2 buffer) at least temporarily, for example until it is overwritten by render output data generated by a subsequently processed (subsequently executed) rendering task (when the local storage is full).

The storing (caching) of regions of the overall render output into local (on-chip) storage of (accessible to) the graphics processor may be controlled in in suitable and desired way. For example, the graphics processor may recognise when rendering followed by post-processing is to be performed (e.g. in response to receiving a request from an application executing on a host processor), and the graphics processor (e.g. a driver of the graphics processor) may accordingly determine that operation in the manner of the technology described herein is to be performed (where post-processing tasks are issued without waiting for all of the rendering tasks to complete their processing), and accordingly cause the graphics processor to store (cache) the contents of the level 1 cache (e.g. tile buffer) into local storage (e.g. level 2 cache). Any other suitable and desired control could be performed however.

When performing (executing) a post-processing task, the graphics processor is configured to (attempt to) retrieve the region of the render output which it is to process from local storage in which it has been stored (where it will may still be present if it has not yet been overwritten).

Regarding the overall order of issuing (and processing) rendering tasks and post-processing tasks for the render pass and post-processing pass, in embodiments rendering tasks and post-processing tasks are issued in an order that front-loads issuing (and performing (executing)) rendering tasks (so that, within the render pass and post-processing pass, at least initially, a greater proportion of rendering tasks are issued compared to post-processing tasks).

Thus, in embodiments, the tasks for the render pass and post-processing pass are issued in an order in which the first one or more tasks consist of rendering tasks (for example being plural rendering tasks, comprising at least some but not all of the rendering tasks for the render pass), then followed by interleaved (a mixture of) rendering tasks and post-processing tasks.

Thus, in embodiments, in the overall order of tasks for the render pass and post-processing pass, post-processing tasks are issued only once a particular, in an embodiment selected, in an embodiment predetermined number of rendering task(s) (corresponding to at least some, but not all of the rendering tasks for the render pass) have been issued and/or have completed their processing (execution).

This may allow dependencies for a plurality of post-processing tasks to be cleared upfront. This may also help with workload balancing for the cores, allowing the cores to be used more heavily for rendering tasks at least initially (for example, executing on the execution circuit(s) of the processing core(s)), before being used more heavily for post-processing tasks (for example, switching to execution by the accelerator circuit of the processing core(s)).

Equally, the front-loading of rendering tasks means that the proportion of post-processing tasks being issued (compared to rendering tasks) increases as the rendering and post-processing passes progress, which may allow data loaded from main memory for the post-processing tasks (e.g. weight data for "kernels" to be applied, in the case of neural network processing) to be re-used from local storage of the graphics processor.

Regarding which processing core(s) rendering tasks and post-processing tasks are issued to, in embodiments (where the graphics processor comprises plural processing cores), the processing core(s) to which rendering tasks and/or post-processing tasks are issued is controlled (selected) to (try to) allow re-use of data from local storage of the processing cores.

In this regard, each processing core may comprise storage which is associated with (e.g. integrated within) the processing core. This storage may comprise, for example any one or more of: a level 1 cache (L1C) (e.g. a load store cache (LSC)); a buffer (e.g. a tile buffer, for example used for storing render output data generated when executing rendering tasks); or any other suitable and desired storage.

Storage associated with (e.g. integrated within) a processing core may be of a relatively small size, such that it stores relatively little data, and for a relatively short time before it is overwritten by newly generated or newly required data. However, the Applicant has recognised that selection of the processing cores to which rendering tasks and/or post-processing tasks are issued can nevertheless facilitate data re-use from this storage among tasks.

In embodiments, the processing core to which a (each) post-processing task is issued is selected (determined) based on which processing core is likely to have data stored locally (e.g. in an L1C or tile buffer of the processing core) which is required for performing the post-processing task.

The data required for performing the post-processing task may include, for example a region of the render output generated by a rendering task on which the post-processing task depends, and/or for example post-processing parameters (e.g. weight data for a kernel, in the case of neural network processing) used by a previous post-processing task which are to be used for the post-processing task.

(Thus) in embodiments, the processing core to which a (each) post-processing task is issued is determined (selected) based on the rendering task(s) and/or the (other) post-processing task(s) which are issued (have been or will be issued) to that processing core.

In embodiments, the allocation of post-processing task(s) to processing core(s) is controlled so as to prioritize issuing of (preferentially issue) a (each) post-processing task to a same processing core that one or more of the rendering tasks it depends on have been issued to. This may improve the likelihood of the post-processing task being able to read render output data which it requires from local storage of the core (e.g. the L1 cache).

Thus, in embodiments, the issuing of a (each) post-processing task to a processing core is controlled based on which processing core(s) the rendering task(s) that the post-processing task depends on have been issued to. In such embodiments, issuing a post-processing task to a processing core may comprise identifying which processing core(s) a (or each) (or the last) rendering task(s) it depends on has been issued to, and then issuing the post-processing task to that identified processing core.

In embodiments, the processing core to which a (each) post-processing tasks is issued is additionally or alternatively determined (selected) based on the (other) post-processing task(s) which are issued to (have been or will be issued to) that processing core.

For example, and in embodiments, the issuing of post-processing task(s) to processing core(s) is controlled so as to prioritise issuing (preferentially issue) a (each) post-processing task to a processing core which has already been issued (allocated) a post-processing task.

In an embodiment, a (each) post-processing task is preferentially issued to a processing core which has recently been issued a post-processing task, for example a processing core for which the last task (or the previous-to-last task, or up to the nth-to-last task, where n is an integer with a particular, in an embodiment selected, in an embodiment predetermined, value) issued to it was a post-processing task.

This may allow data used for the (earlier) post-processing task to be re-used from local memory (e.g. L1C) of the processing core. For example, in the case of post-processing comprising neural network processing, weight data corresponding to a kernel ("filter") may be re-used (without having to be re-loaded into the processing core).

In an embodiment, the issuing of post-processing task(s) to processing core(s) is controlled so as to prioritize issuing (preferentially issue) a (each) post-processing task to a processing core which has been issued a post-processing task that generates an adjacent region of the post-processed output to the post-processing task in question. In other words, in an embodiment one or more post-processing tasks which generate adjacent regions of the overall render output are issued to a same processing core as each other.

In this regard, post-processing tasks generating adjacent regions of the post-processed output may use at least some of the same render output data when performing their processing (for example due to a post-processing task using boundary region from the overall render output (e.g. due to the receptive field, in the case of neural network processing), which overlaps with a region of the render output used by another post-processing task generating an adjacent region of the post-processed output). Such render output data may accordingly be re-used if such post-processing tasks are issued to the same processing core.

Thus, in embodiments, allocating a (each) post-processing task to a processing core may comprise identifying which processing core(s) a (or each) post-processing task generating an adjacent region of the post-processed output has been issued to, and then allocating the post-processing task to an identified processing core.

From a more general aspect, it may be the case that different post-processing tasks require at least some of the same data (for example from the overall render output and/or other post-processing parameters (e.g. weight data in the case of neural network processing)) to perform their processing. Thus, in embodiments, allocating a (each) post-processing task to a processing core comprises identifying which processing core a post-processing task using at least some of the same data has been issued to, and then (preferentially) allocating the post-processing task to that identified processing core.

Identifying which processing core(s) rendering task(s) and/or post-processing tasks have been issued to (for example as in embodiments discussed above) may be done in any suitable and desired way. In embodiments, this is done by checking a queue of tasks which have been issued to (but are waiting to be performed by) the respective processing core(s). Alternatively, this could be done by maintaining (and checking) a record of which cores the rendering task(s) and/or post-processing task(s) have been issued to.

Whilst it would be possible to issue rendering tasks and post-processing tasks individually (separately) to processing core(s) (and in embodiments this is done), the Applicant has recognised that it is alternatively or additionally possible (and may be desirable) to issue one or more 'combined' rendering and post-processing tasks.

Each 'combined' task, in embodiments, comprises a rendering task and a post-processing task, which are issued together (at the same time) to the same processing core, in an embodiment along with metadata indicating an order in which the rendering task and post-processing task are to be performed by the processing core.

Each 'combined' task may comprise any suitable and desired number of rendering tasks and post processing tasks (the rendering task(s) and post-processing task(s) having any of the features described herein). In embodiments, each combined task consists of a single rendering task and a single post-processing task.

A 'combined' task may (and in embodiments does) (is permitted to) comprise one or more, e.g. a, post-processing task and a rendering task on which the post-processing task(s) depends. Consistent with the above discussion, this may allow results generated when executing the rendering task of the 'combined' task to be obtained from local storage within the core (e.g. in L1 cache or tile buffer) when performing the post-processing task of the 'combined' task.

Alternatively (or additionally), a 'combined' task may (and in embodiments does) (is permitted to) comprise a rendering task and a post-processing task which are independent of one another (so that the rendering task does not depend on the post-processing task). Such a rendering task and post-processing task could be executed in any order relative to one another.

Any suitable and desired number of 'combined tasks' may be used for performing the rendering and post-processing passes. Thus, in embodiments, one or more of (in embodiments at least some of, in embodiments all of) the tasks for the rendering and post-processing passes are issued as 'combined' tasks.

In embodiments, a processing core, when it receives a 'combined' task to execute (process), performs the rendering task (rendering processing) using an execution circuit of the processing core, and performs the post-processing task (post-processing) using an accelerator circuit (e.g. neural processing circuit) of the processing core.

When a processing core receives a 'combined' task it may perform (execute) the rendering task before performing post-processing task (for example if indicated to do so by the 'combined task', for example when the 'combined' task comprises a post-processing task and a rendering task on which it depends).

A processing core may (also) be configured to (permitted to) perform a rendering task at the same time as (in parallel with) a post-processing task (e.g. by the execution circuit and the accelerator circuit respectively) (and this may be done, for example, if indicated to do so by the 'combined task', for example when the 'combined' tasks comprises a post-processing task and a rendering task which are independent of one another). This may provide an efficient way of performing work within the processing core.

As will be apparent, in various embodiments of the technology described herein, the graphics processor controls processing (e.g. controlling the order of issuing rendering tasks and post-processing tasks, and e.g. controlling which processing cores rendering tasks and post-processing tasks are issued to) based on the dependencies of post-processing tasks on rendering tasks, which as discussed herein may be predictable (e.g. known, or predetermined).

In this regard, which rendering tasks the post-processing tasks depend on could be identified in any suitable and desired way, and at any suitable and desired stage of the processing described herein. For example, the graphics processor could determine dependencies of post-processing tasks on rendering tasks when dividing the graphics processing work to be performed into rendering tasks and post-processing tasks (e.g. in response to receiving a request to perform graphics processing work, e.g. from an application executing on a host processor (CPU)).

When dependencies are determined in advance, the graphics processor could record the dependencies in any suitable and desired way, for example by providing an indication associated with each post-processing task of the rendering task(s) on which it depends, or storing information (e.g. in suitable storage) indicating dependencies (e.g. indicating a mapping between post-processing tasks and the rendering task(s) on which they depend). Such determined and recorded dependencies could be used to inform the order of issuing rendering tasks and/or the order of issuing post-processing tasks, and/or the controlling of which processing cores rendering tasks and post-processing tasks are issued to.

Alternatively or additionally, the dependencies of post-processing tasks upon rendering tasks could be determined on the fly (as and when required when performing the rendering pass and the post-processing pass). For example, the dependency of a (each) post-processing task may be determined based on a region of the overall render output which it is to use (which may be indicated in the post-processing task itself). This may be compared against data indicating which regions of the overall render output have been generated by rendering tasks (e.g. as indicated in a 'task completion status' data, e.g. a scoreboard, as discussed herein for example).

The technology described herein is concerned with the operation of a graphics processor for performing a render pass which generates an overall render output (e.g. frame (image), render-to-texture output, etc.), and a post-processing pass which processes the overall render output (e.g. frame (image)) to generate a post-processed output.

Although described above in relation to a render pass for a single render output (frame (image)) and a corresponding post-processing pass to generate a single post-processed output, it will be appreciated that plural (e.g. successive) render outputs (frames) could be generated in the manner of the technology described herein, for example corresponding to video content which is desired to be displayed.

In the technology described herein, post-processing tasks for a post-processing pass which (directly) uses the results of a render pass are permitted to be issued without waiting for all of the rendering tasks for the render pass to have completed their processing.

In embodiments, post-processing tasks for (only) a single post-processing pass (a sole post-processing pass, or a first post-processing pass of a plurality of post-processing passes to be performed) are permitted to be to be issued before the rendering tasks for the render pass have completed their processing.

Alternatively, in embodiments where a plurality of post-processing passes are to be performed, each comprising a set of one or more post-processing tasks (e.g. each post-processing pass corresponding to a layer of a plurality of layers of neural network processing), it would be possible to issue post-processing tasks for plural post-processing passes (e.g. an initial and one or more subsequent (non-initial)) post-processing passes) before the rendering tasks for the render pass have completed their processing (and in embodiments this is done).

For example, it may be the case that tasks for one or more subsequent (non-initial)) post-processing passes rely on the results from (and so depend on) one or more rendering tasks of the rendering pass. In this case, post-processing tasks for subsequent (non-initial) post-processing tasks may be issued based on the order in which rendering tasks complete (or are expected to complete) their processing (e.g. in a similar way as discussed above, e.g. by issuing a (each) post-processing task in response to determining that the rendering task(s) which it depends on have completed their processing, e.g. by checking a 'task completion status' data structure).

In the technology described herein, post-processing tasks are permitted to be issued before all of the rendering tasks for the (final) rendering pass which generates the overall render output have completed their processing (based on the order in which those rendering tasks complete (or are expected to complete) their processing).

In embodiments, when rendering is performed which comprises plural rendering passes, the completion (or expected completion) of rendering tasks for earlier rendering passes (before the final rendering pass which generates the overall render output) is not considered (e.g. and not checked, e.g. not tracked) for the purpose of issuing post-processing tasks.

In embodiments, the control of the technology described herein may be selectively disabled. That is, in some embodiments, graphics processor may be permitted to selectively prohibit the issuing of post-processing tasks before all of the rendering tasks have completed their processing. Thus, in embodiments, the graphics processor may be operable to enforce a strict (hard) processing barrier between the render pass and post-processing pass if desired (for example if a situation arises where it is necessary or desirable to do so).

The graphics processor of the technology described herein may have any suitable and desired configuration for performing the functions described herein.

The graphics processor of the technology described herein comprises one or more (in an embodiment plural) processing (shader) cores which are operable to and configured to perform (execute) processing tasks (including the rendering tasks and post-processing tasks described herein) which are issued to the processing core(s).

Each processing core is in an embodiment operable to (and configured to) process (execute) tasks independently of the operation of the other processing cores. As such, rendering tasks and/or post-processing tasks which are issued to different processing cores may be performed in parallel (at the same time).

The processing core(s) may each comprise appropriate circuit(s) for performing (executing) the rendering tasks and/or post-processing task. For example, each processing core may comprise an execution circuit (execution engine) which is operable to (configured to) execute graphics processing tasks. The execution circuit is in an embodiment used for executing rendering tasks. The execution circuit may also be used for executing post-processing tasks.

A (each) processing core may (also) be in communication with (in an embodiment comprise) an accelerator circuit (accelerator), which is particularly configured for efficiently performing (executing) certain types of tasks (operations) (and which may be used for performing post-processing tasks, instead of the execution circuit).

The accelerator circuit is in embodiments a neural processing circuit (neural engine) which is particularly configured for performing neural processing (e.g. comprising an appropriate arrangement of functional units, e.g. comprising a plurality of multiply-accumulate circuits, for efficiently performing neural network processing). In this case, post-processing tasks comprising neural processing may be performed using the neural processing circuit (neural engine) of a processing core.

The execution circuit may be configured to operate simultaneously (at the same time) as the accelerator circuit (so that the processing core can simultaneously perform rendering tasks using the execution circuit, and post-processing tasks using the accelerator circuit). Alternatively, (for example where the execution circuit and accelerator circuit are not operable simultaneously), the processing core may power up and down the execution circuit and accelerator circuit as needed to respectively process the rendering tasks and post-processing tasks which it has been issued.

The graphics processor, in the technology described herein, is operated so that post-processing task(s) are issued to the processing core(s) (by a task issuing circuit) without waiting for all of the rendering tasks for the render pass to have completed their processing.

The graphics processor (task issuing circuit) may be configured to control the order of issuing of rendering tasks and post-processing tasks to the processing cores, consistent with the embodiments disclosed herein.

For example, the graphics processor (task issuing circuit) may be configured to determine an initial (predetermined) order for issuing rendering tasks and/or post-processing tasks (prior to issuing any rendering tasks and/or an post-processing tasks to the post-processing core(s)), for example in response to receiving a request from a host-processor (e.g. CPU) to perform processing to generate an output to be displayed.

The graphics processor (task issuing circuit) may be configured to dynamically control the order of (e.g. adjust an initial (predetermined) order for) post-processing tasks based on the completion of rendering tasks. The graphics processor (task issuing circuit) may, for example, be configured to track the completion of rendering tasks (and determine whether to issue a post-processing task based on the tracking of completion of rendering tasks), as described herein.

The graphics processor (task issuing circuit) may (also) be configured to control which processing core(s) the rendering tasks and post-processing tasks are issued to, consistent with the discussion herein.

In embodiments the graphics processor comprises local, on-chip storage, for example comprising one or more caches and/or buffers. The local, on-chip, storage may comprise a hierarchy of storage (e.g. level 1 cache, level 2 cache, level 3 cache, and any other and suitable levels of storage), through which data may be successively passed when writing to and/or reading from main memory.

The graphics processor may be in communication with a main, off-chip memory (e.g. of a data processing system which the graphics processor is part of). The main memory may be shared by the graphics processor, a host processor (e.g. CPU) and any other components of the data processing system.

Regarding local storage of the graphics processor, each processing core may comprise local storage (which is integrated within the processing core). This storage may be referred to as a level 1 cache (L1C), and may be used by the execution engine and/or accelerator circuit when performing rendering and/or post-processing tasks. This storage is typically small, and may be used primarily for storing data for a task which is currently being processed. This storage may comprise a load storage cache (LSC), and a tile buffer (the tile buffer in embodiments being used specifically to store render output data generated when performing rendering tasks).

The local storage of the graphics processor may (also) comprise storage which is shared between the processing cores (and so, in embodiments, is accessible to all of the processing cores). This storage is in an embodiment separate from (not integrated within) the processing cores. This storage may be, for example, a level 2 cache (L2C)).

Additional hierarchical layers of storage through which data passes on its way from the main memory to the processing core(s) could also be provided, if desired for managing data storage. For example, there may be local, on-chip, storage shared between the graphics processor and a host processor (CPU) (a level 3 cache (L3C), also referred to herein as a "system level cache" (SLC).

In embodiments, as described herein, the order of issuing rendering tasks and post-processing tasks, and/or the processing core(s) to which rendering tasks and post-processing tasks are issued, may be controlled so that when processing (executing) a post-processing task it is likely that data required for processing will have recently been stored in (still be present in) (some level of the hierarchy of) in local storage of the graphics processor. In this way, a processing core executing a post-processing task is likely to be able to retrieve at least some of the data required for the post-processing task from the local storage (rather than having to retrieve the data from main memory).

In addition to the features and functions described above, the graphics processor of the technology described herein may have any of the usual and desired features and functions of a graphics processor.

For example, the processing core(s) (shader core(s)) of the graphics processor may be operable to execute any suitable and desired tasks (operations) as may be required for graphics processing (e.g. for performing rendering, post-processing, and any other suitable and desired graphics processing for a graphics processing pipeline). The (programmable) execution unit or units (circuit or circuits) of each processing core may accordingly comprise any suitable and desired functional unit(s) as may be needed to perform data processing operations. In addition to the (programmable) execution unit(s) (circuit(s)) of the processing core(s), the processing core(s) may also comprise one or more essentially fixed-function (hardware) stages for implementing certain stages of the graphics processing pipeline. These fixed-function stages may be used to handle certain fragment "frontend" processing operations for setting-up the fragment shader program (which may include, for example, primitive list reading, resource allocation, vertex fetching, rasterisation, early depth/stencil testing, or other processing).

There may be any suitable and desired number of processing cores within the graphics processor, to which tasks (such as the rendering tasks and post-processing tasks described herein) can be issued for being performed in parallel.

The processing core(s) (shader core(s)) of the graphics processor may be in communication with any suitable and desired storage, for example such as that described herein.

The graphics processor of (operated in the manner of) the technology described herein may generally find application in any suitable data processing system which may have need of performing graphics processing.

The graphics processor of the technology described herein may, for example, be part of a data processing system of an electronic device, such as a desktop computer, or (in an embodiment) a portable device (such as a laptop, mobile phone, tablet, headset, wearable device, or other portable device), or a purpose-built computing device (for example, a computing device for use in medical or other scenarios. Thus, the technology described herein also extends to an electronic device that includes the graphics processor of the technology described herein (and in which the graphics processor operates in the manner of the technology described herein).

The graphics processor may be integrated within a system on chip (SoC) (of the data processing system). The data processing system in which the graphic processor is integrated may be a microprocessor system, a programmable FPGA (field programmable gate array), etc.

The graphics processor may be in communication with any suitable and desired components and elements of a data processing system, such as one or more of: a host processor (e.g. central processing unit (CPU)) (which may be part of the SoC), one or more data stores (for example comprising local, (on-chip) memory, and main (off-chip) memory), and a display.

The host processor (CPU) may execute application(s) requiring graphics processing (such as a video game, XR application, or any other suitable and desired application), which may require graphics processing to be performed by the graphics processor to produce a graphics output (e.g. frame(s) for display).

The display (on which the graphics output generated by the graphics processor is to be displayed) may comprise for example a display screen (e.g. of a laptop, mobile phone, tablet, headset, wearable device, or the like), or any other suitable and desired display).

Thus, in embodiments, the graphics processor comprises, and/or is in communication with, one or more memories (storage) and/or memory devices (storage devices) that store the data described herein, and/or store software for performing the processes described herein. The graphics processor may also be in communication with a host microprocessor, and/or with a display for displaying images based on the data generated by the graphics processor.

The graphics processor (GPU) may operate in any suitable and desired manner to produce a graphics output, but in an embodiment when the graphics processing requires post-processing of an initially generated render output, the graphics processor can operate (is caused to operate) in the manner described herein.

In an embodiment, the various functions of the technology described herein are carried out on a single graphics processor that generates and outputs the rendered data (or in the case that post-processing is performed, outputs the post-processed data), that is, e.g., written to a frame buffer for a display device.

The technology described herein may be used particularly for a graphics processor performing tile-based rendering in which a render output (e.g. a frame) is subdivided into plural rendering tiles for the purposes of rendering. In that case each rendering tile may and in an embodiment does correspond to a respective region of the overall render output (e.g. frame) that is being generated (and is can be generated using rendering tasks for the respective regions).

The graphics processor of the technology described herein may be implemented as part of any suitable system, such as a suitably configured micro-processor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuits may share processing circuits, etc., if desired.

Thus the technology described herein extends to a graphics processor and to a data processing system including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows a data processing system (computer graphics processing system) 1, which may be operated to perform computer graphics processing in embodiments of the technology described herein.

The data processing system 1 comprises a host processor (central processing unit, CPU) 3 and a graphics processor (graphics processing unit, GPU) 2.

The graphics processor 2 is configured to perform graphics processing, for example as may be required by an application (e.g. a game) executing on the host processor 3, requiring an output (e.g. frame (image)) to be generated and displayed.

Each of the CPU 3 and GPU 2 may have access to their own local (on-chip) storage 5, 4.

The CPU 3 and GPU 2 may have access to shared, on-chip, storage 7 (e.g. a Level 3 cache, also referred to herein as a "system level cache" (SLC)), which may be accessed via a suitable interconnect 6.

The data processing system 1 may comprise a main (off-chip) memory 9, which may be accessed (written to and/or read from) using a dynamic memory controller (DMC) 8.

Figure 2:
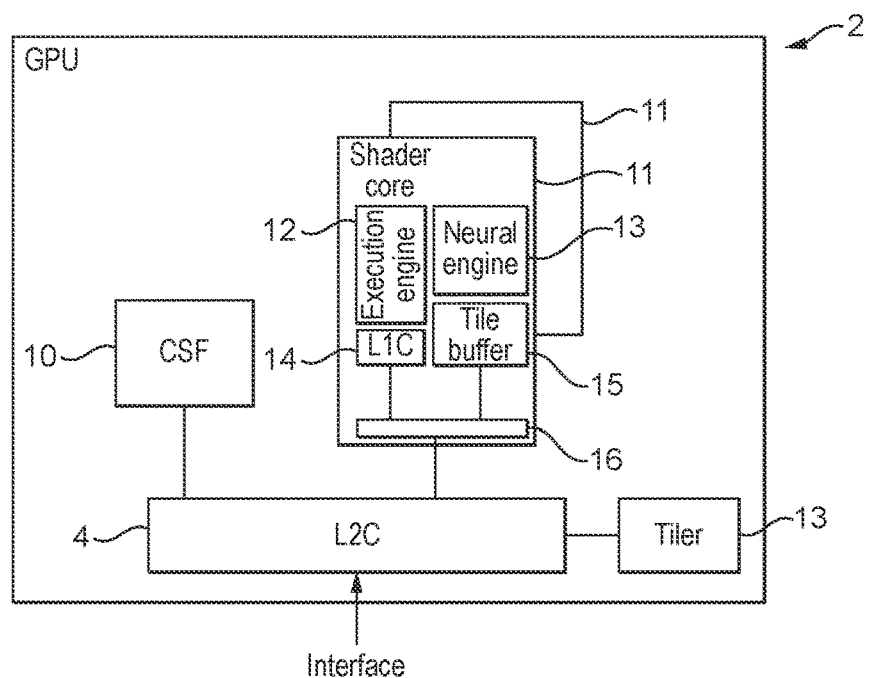
FIG. 2 illustrates schematically a graphics processor according to embodiments of the technology described herein.

FIG. 2 shows the components of the graphics processor 2 in more detail.

The graphics processor 2 has one or more (in an embodiment plural) processing cores (shader cores) 11 which can be used for performing (executing) processing tasks.

The processing core(s) 11 may perform tasks such as rendering tasks, for generating an overall render output (e.g. a frame (image)).

The rendering tasks could, for example, comprise geometry or fragment shading tasks (which when executed cause fragment shading to be performed, comprising determining the appearance of sampling positions based on non-position attributes of vertices of primitives). Alternatively (or additionally), the rendering tasks could comprise tasks for performing ray tracing.

In embodiments of the technology described herein, the processing core(s) 11 of the graphics processor 2 are also used to perform generic compute, machine learning, or post-processing tasks, which perform processing using the overall render output (image) to generate an overall post-processed output (post-processed image).

The post-processing tasks may comprise (perform) any suitable and desired post-processing, such as de-noising, super-sampling, applying one or more filters, and changing one or more properties of an overall render output (image) such as saturation, depth-of-field, tone mapping. The post-processing tasks could additionally or alternatively comprise (perform) generation of new frame(s) (image(s)) based on an overall render output (image). The post-processing may comprise neural network processing, in which case the post-processing tasks may be neural network processing tasks.

The processing core(s) 11 could also be used to perform other tasks if desired, such as (and in embodiments) tasks for rasterising. Tasks for rasterising may be performed prior to task(s) for rendering.

The processing core(s) 11, may each comprise an execution circuit (execution engine) 12 which is operable to (configured to) perform (execute) processing tasks.

A (each) processing core 11 may also have an accelerator (for example a texture mapper (not shown)), which may be configured to efficiently perform certain types of tasks (operations). The accelerator shown in FIG. 2 is a neural processing circuit (neural engine) 13, which is can be used for executing tasks for performing neural network processing.

In embodiments, the accelerator is used for performing (executing) post-processing tasks (for example, such as post-processing tasks which require neural network processing are performed (executed) by the neural engine 13), whereas the execution circuit 12 is used for performing (executing) general processing and rendering tasks.

A (each) processing core 11 may be in communication with any suitable and desired local, on-chip, storage. The local storage may form a hierarchy through which data passes may pass when it is being retrieved from main memory 9 and when it is being written to main memory 9.

The local storage (hierarchy) may comprise storage integrated within a (each) processing core 11, from which data is read and/or to which data is written when performing (executing) processing tasks. This may comprise level 1 cache (L1C) 14, and tile buffer 15. The tile buffer 15 may be used in particular for storing regions (tiles) of the overall render output as they are generated when executing rendering tasks).

The local storage (hierarchy) may also comprise storage which is separate from (not integrated within) the processing core(s) 11, such as a level 2 cache (L2C) 4 of the graphics processor 2.

Additional levels of hierarchical storage may also be used if desired, for example including the Level 3 cache ("system level cache" (SLC)) 7 shown in FIG. 1.

The graphics processor 2 may be configured to perform tile-based rendering, and so may also comprise a tiling circuit (tiler) 13 which is operable to perform tiling operations (comprising constructing lists of primitives to be rendered to generate respective regions (tiles) of the overall render output).

The graphics processor has a task issuing circuit (command stream frontend (CSF)) 10 for controlling the issuing of processing tasks to the processing core(s) 11.

Figure 3:
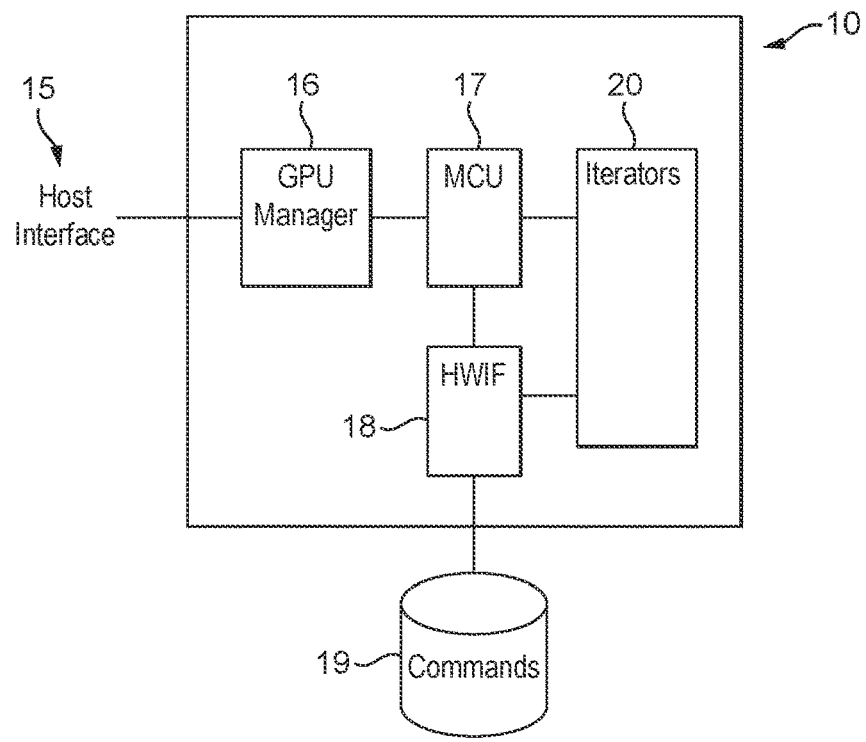
FIG. 3 illustrates schematically a task issuing circuit of the graphics processor of FIG. 2.

FIG. 3 shows the task issuing circuit 10 in more detail.

The task issuing circuit 10 is operable to receive requests for graphics processing from an application that is executing on a host processor (e.g. CPU 3), via a host interface 15.

The task issuing circuit 10 may divide the required graphics processing into suitable processing tasks (for example comprising the rendering and post-processing tasks discussed herein), from a command stream containing commands for performing the required processing. For example, a GPU manager 16 may be used by the host processor (via the host interface 15) to configure the GPU, including indicating where the commands (the command stream) to be read by a hardware interface (HWIF) 18 are located in memory 19. The hardware interface 18 obtains the commands (the command stream) from the storage 19, and executes the commands which, e.g., configure "jobs" to be performed by the GPU. (Some commands may be executed directly by the hardware interface 18. Other commands may be partly or completely executed in software by a microcontroller (MCU) 17.) The hardware interface 18 and MCU 17 issue "jobs" to iterators 20 in response to commands, which iterators 20 then split the "jobs" into respective tasks that they then issue to processing core(s) 11.

Figure 4:
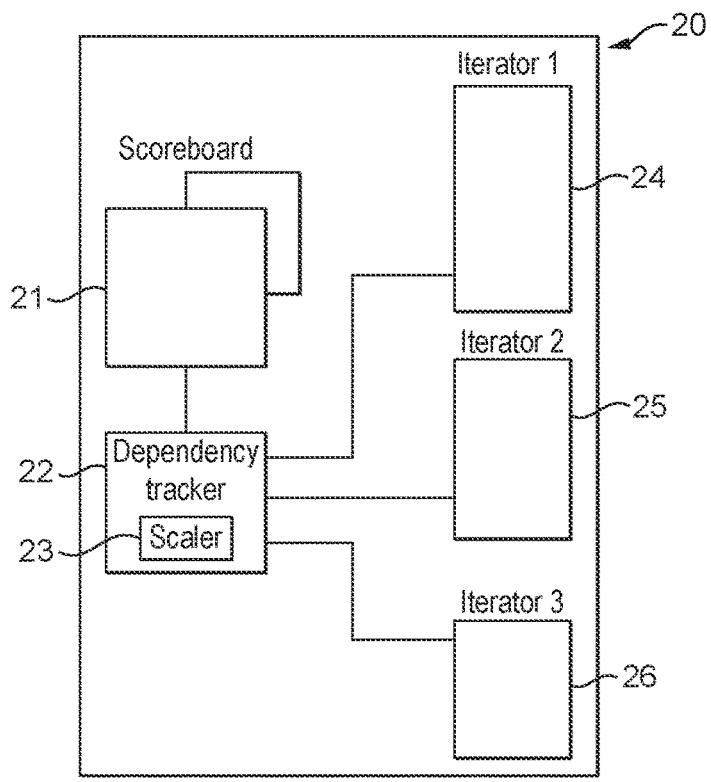
FIG. 4 illustrates in more detail the components of the task issuing circuit of FIG. 3, which include a scoreboard for tracking the completion of rendering tasks.

FIG. 4 shows the iterator 20 of the task issuing circuit in more detail.

The iterator 20 may comprise respective iterators 24, 26, 26 for submitting different types of tasks to the processing core(s). For example a first iterator 24 may submit rendering tasks, a second iterator 25 may submit post-processing tasks (e.g. neural network processing tasks), and a first iterator 26 may submit other tasks (e.g. compute tasks).

The first iterator 24 in embodiments submits rendering tasks to processing core(s) according to a predetermined, e.g. static, order.

The second iterator 25 is in embodiments controlled to permit post-processing tasks to be issued to the processing core(s) before all of the rendering tasks have been submitted. In embodiments, however, post-processing tasks are only permitted to be issued once the rendering tasks on which they depend have completed their processing (once the region of the render output to be processed by the post-processing task has been generated).

In embodiments, the iterator 20 of the task issuing circuit 10 comprises a dependency manager (dependency managing circuit) 22 which identifies, for each post-processing task to be issued, whether the rendering tasks on which it depends have completed their processing.

In embodiments, this is done by the dependency manager 22 checking a 'task completion status' data structure (scoreboard) 21 that indicates which rendering tasks have completed their processing (which regions of the render output have been generated by rendering tasks).

A (each) post-processing task is then issued only if the 'task completion status' data structure (scoreboard) 21 indicates that the rendering tasks on which the post-processing task depends have completed their processing (if the regions of the render output to be processed by the post-processing task have been generated).

In embodiments, the scoreboard 21 may comprise a plurality of indicators, each representing whether a group of one or more rendering tasks for the rendering pass have completed their processing (in other words, each indicator representing whether a particular region of the render output has been generated). The dependency manager 22 may comprise appropriate circuitry (scaler) 23 for identifying, for a (each) post-processing task to be issued, which indicator(s) of the scoreboard represents the rendering tasks on which the post-processing task depends, and should be checked before issuing the post-processing task.

In embodiments, the scaler 23 determines which indicator(s) of the scoreboard 21 are relevant to (and should be checked before issuing) a post-processing task by determining which indicator(s) relate to regions of the overall render output that overlap (at least partially) with the region of the overall render output to be processed by the post-processing task.

The indicators of the scoreboard 21 are updated as and when rendering tasks complete their processing, for example with the relevant indicator being updated (with an update being triggered) when a (each) rendering task generates and writes to storage (e.g. to the tile buffer 15) a region of the overall render output.

The scaler 23 may determine, as rendering tasks complete, which indicators of the scoreboard 21 should be updated (which indicator(s) tracks one or more rendering tasks including the rending task in question) (in other words which indicator(s) relate to a region including the region of the overall render output generated by the rendering task).

It is noted that, in the case of rendering comprising plural rendering passes, the completion of rendering tasks for each of the rendering passes could be tracked by the 'task completion status' data structure (e.g. by providing 'one or more additional scoreboards 21 for tracking the completion of rendering tasks of earlier rendering passes), for example so as to help enforce dependencies between rendering tasks in different rendering passes. However, in embodiments only the scoreboard 21 for the (final) rendering pass which generates the overall render output is checked for when determining whether to issue post-processing tasks (so that any scoreboards for earlier rendering passes are checked when determining whether to issue post-processing tasks).

Figures 5, 6:
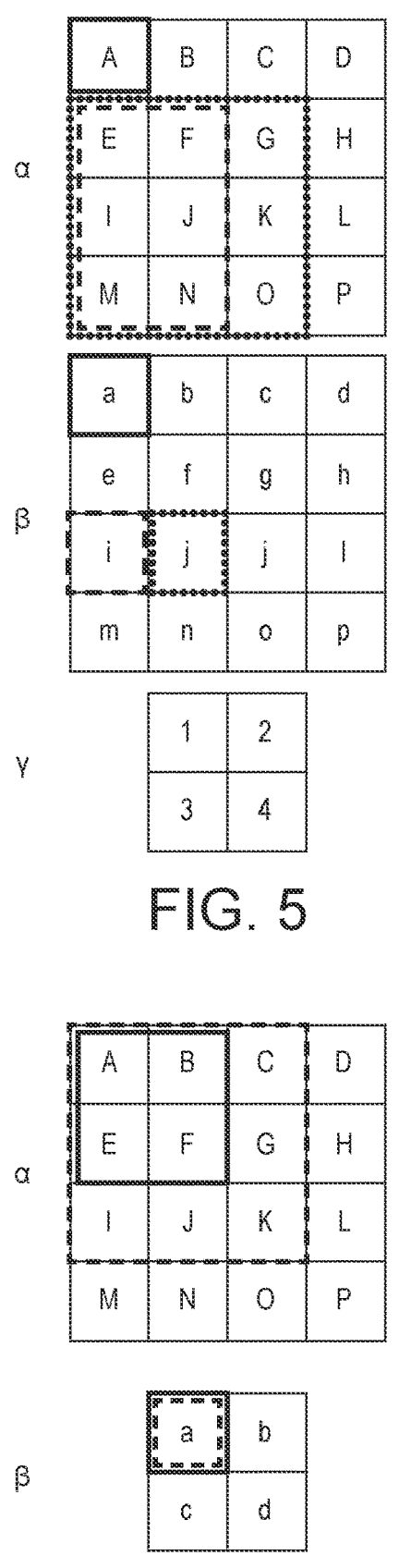

FIG. 5 illustrates an overall render output (frame (e.g. image)) a comprising regions "A" to "P" generated by respective rendering tasks of a rendering pass, and a post-processed output β comprising regions "a" to "p" generated by respective post-processing tasks (e.g. neural network processing tasks) of a post-processing pass.

In the example shown, the overall render output is divided into a 4×4 array of 16 regions (generated by corresponding rendering tasks), which are each the same square shape and the same size. Each region "A" to "P" may correspond to a "tile" of the render output when generated by using tile-based rendering.

Figure 17:
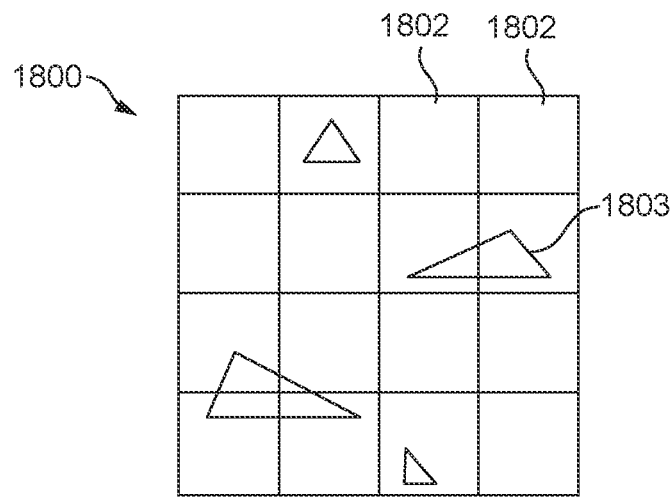
FIG. 17 illustrates a scene which may be rendered using one or more rendering passes.

In this regard, FIG. 17 shows an example scene 1800 to be displayed, which is divided into a plurality of tiles 1802 for the purpose of rendering, and which may be processed using one or more render passes to generate the overall render output (frame (e.g. image)) a. The scene 1800 may correspond to a view from a 3D model. Objects within the scene 1800 may be represented as (composed of) primitives 1803 (basic components such as simple polygons, e.g. triangles, representing objects within the scene). Other operations, such as position shading, primitive assembly, and tiling may be performed in the conventional way if required prior to rendering of the scene.

Whilst FIG. 17 shows an array of 4×4 tiles, a larger number of tiles could be used if desired (e.g. such as an array of 64×64 tiles). Equally, the overall render output could be divided into more regions (tiles) than shown in FIG. 5.

If desired, the regions (tiles) of the overall render output generated by rendering tasks could differ in size and/or shape relative to one another. Whilst two-dimensional regions are shown (having an x and y extent), the regions could have any suitable and desired dimension, e.g. 1D, 3D, 4D, etc. . . . , for example also having a depth (z) dimension for example corresponding to a plurality of images being processed simultaneously.

The overall render output α, could be generated by a single (sole) rendering pass, for which respective rendering tasks generate regions "A" to "P". However, the rendering pass which generates the overall render output α could equally be a final rendering pass of a plurality of rendering passes (the earlier rendering passes generating intermediate render outputs).

The post-processed output β is generated by performing post-processing (e.g. neural network processing) of the overall render output α.

As such, the generation of each region of the post-processed output "a" to "p" depends on the generation of one or more regions "A" to "P" of the overall render output (and so each post-processing task for the post-processing pass depends on the completion of one or more rendering tasks for the render pass).

In the example shown in FIG. 5, the post-processed output β is divided into the same number, size and shape of regions as the overall render output α.

It could arise that each post-processing task, uses a region of the overall render output α which is the same size as the region of the post-processed output β which it generates (so that there is a direct mapping between the regions generated by respective rendering tasks and regions used by respective post-processing tasks). It may therefore arise that each post-processing task depends only on a single rendering task. For example, the post-processing task generating region "a" of the post-processed output could use only region "A" of the overall render output and so depend only on the rendering task which generates region "A". Similarly, post-processing task generating region "b" could depend only on the rendering task which generates region "B", and so on. It may be the case that no two post-processing tasks depend on a same rendering task.

Alternatively, there could be an offset between the region of the overall render output α used by a post-processing task and the region of the post-processed output generated by that task. In this case, for example, the post-processing task generating region "a" of the post-processed output could use region "B" of the overall render output and so depend only on the rendering task which generates region "B".

Alternatively, it may be the case that a (or each) post-processing task uses a region of the overall render output α which is larger than the region of the post-processed output β which it generates, for example using a region of the overall render output generated by plural rendering tasks including 'boundary' data (region(s)) needed by the post-processing task. This may be the case, for example, for post-processing tasks which are neural network processing tasks, which may generate a region of the post-processed output by applying a weight data array (filter) ("kernel") to a larger region of the overall render output.

Thus, for example, a post-processing task which generates region "j" of the post-processed output may depend on the rendering tasks which generate (may use) regions E, F, G, I, J, K, M, N and O of the overall render output (in other words, using region J, and boundary regions E, F, G, I, K, M, N, and O). Likewise, a post-processing task which generates region "i" of the post-processed output may depend on the rendering tasks which generate (may use) regions E, F, I, J, M and N of the overall render output (in other words, using region I, and boundary regions E, F, J, M and N). In such cases different post-processing tasks may depend on at least some of the same rendering tasks.

Whilst FIG. 5, shows the post-processed output β divided into the same number, size and shape of regions as the overall render output α, this is not necessarily the case. The regions of the post-processed output β (generated by respective post-processing tasks) could differ in number and/or size and/or shape compared to the regions of the overall render output α (generated by respective rendering tasks).

Whilst two-dimensional regions of the post-processed output β are shown (having an x and y extent), the regions could have any suitable and desired dimension, e.g. 1D, 3D, 4D, etc. . . . , for example also having a depth (z) dimension for example corresponding to number of channels being processed.

FIG. 6 shows an example post-processed output β which is divided into fewer regions than the regions of the overall render output α.

In the example shown in FIG. 6, it may be the case, for example, that the post-processing task which generates region "a" depends on the rendering tasks which generate regions (uses regions) "A", "B", "E", and "F". Likewise, the post-processing task which generates region "b" may depend on the rendering tasks which generate regions "C", "D", "G", and "H", and so on (so that there is a direct mapping between the regions generated by respective rendering tasks and regions used by respective post-processing tasks).

Alternatively, where post-processing tasks also use boundary data (regions), then in the example shown in FIG. 6, the post-processing task which generates region "a" may depend on the rendering tasks which generate regions (use regions) "A", "B", "E", and "F", and additionally on the rendering tasks which generate boundary regions (use regions) "C", "G", "I", "J" and "K".

Figure 7:
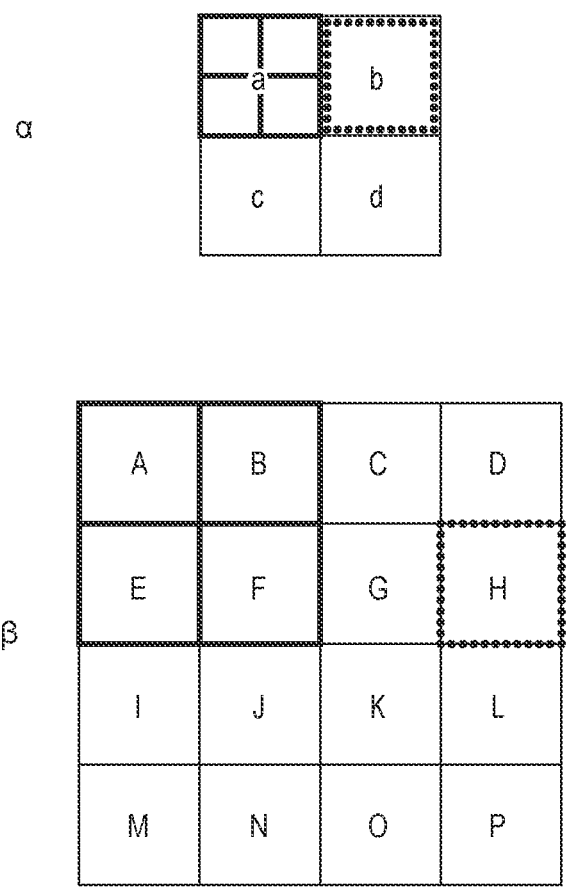

FIG. 7 shows a post-processed output β which is divided into more regions than the overall render output α.

In the example shown in FIG. 7, post-processing tasks "A", "B", "E", and "F" may each depend only on the rendering task which generates region "a" (may each use part of region "a"), so that any of those post-processing tasks can be performed once the rendering task which generated region "a" has completed its processing.

Alternatively, where post-processing tasks also use boundary data (regions), then in the example shown in FIG. 7, the post-processing task which generates region "H", for example, may use (all of) region "b" and (part of) region "d", so that it can only be performed once the rendering tasks which generate regions "b" and "d" have completed their processing.

Figure 8:
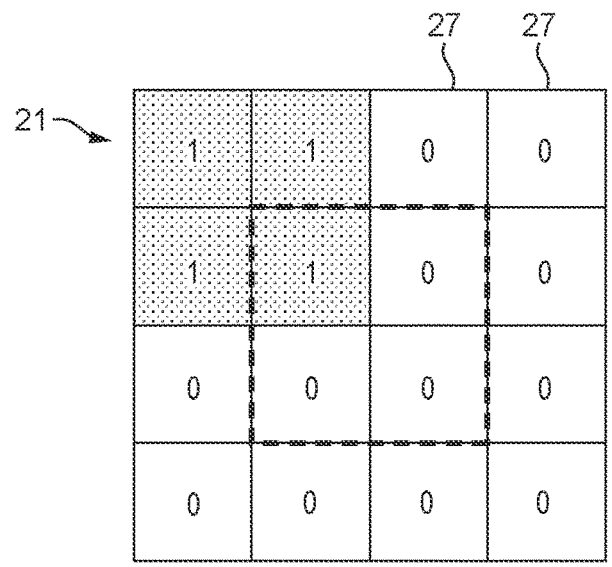
FIG. 8 illustrates an example 'fine' scoreboard which can be used for tracking completion of rendering tasks, such as for rendering pass α shown in FIG. 5.

Whilst FIGS. 7 and 8 show only a single post-processing pass β, the post-processing could be performed using a plurality of post-processing passes which operate in turn (so that the output from one post-processing pass, becomes the input for a next post-processing pass, and so on until the final post-processing pass has been competed). FIG. 5, for example, shows a post-processing pass γ which follows the post-processing pass β.

In embodiments, the control of issuing post-processing tasks for only a first post-processing pass β is done by checking whether the rendering tasks on which they depend have completed (e.g. by checking a scoreboard 21 as discussed above). Alternatively, it would be possible to control issuing of post-processing tasks for one or more later post-processing passes (generating respective post-processing outputs, such as γ) by checking whether the rendering tasks on which they (indirectly) depend have completed (e.g. by checking a scoreboard 21 as discussed above).

For example, in the example shown in FIG. 5, the post-processing task which generates region "1" of post-processed output γ, may depend on the post-processing tasks which generate regions "a", "b", "e", and "f" of post-processing pass β, which in turn may depend on the rendering tasks which generate regions "A", "B", "E", and "F" of overall render output α (so that the post-processing task which generates region "1" indirectly depends on the rendering tasks which generate regions "A", "B", "E", and "F", and so could be issued in response to determining that those rendering tasks have completed their processing).

As noted above, the post-processing could be performed using neural network processing. In this case, each post-processing pass (e.g. β, γ), may correspond to a layer of neural network processing.

Figure 18:
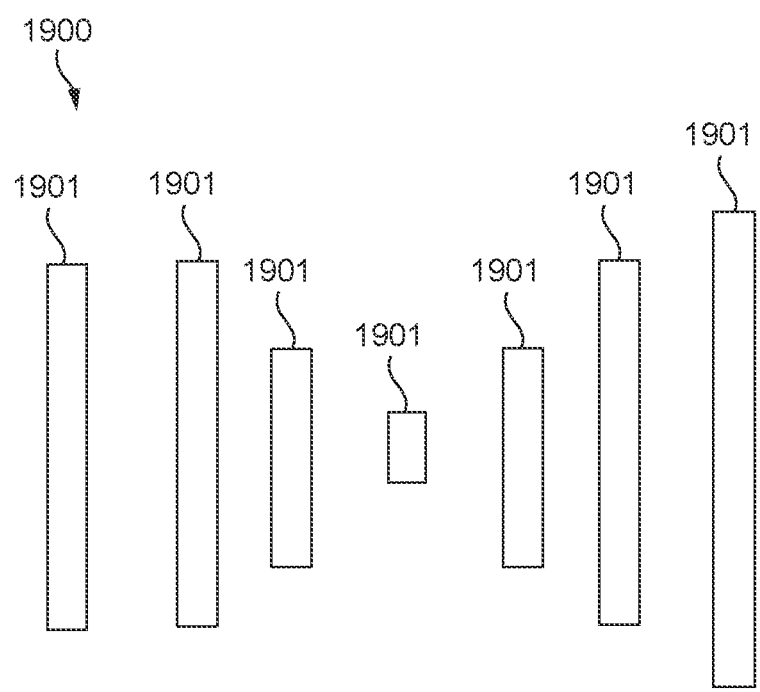
FIG. 18 schematically an exemplary neural network, which may be used for performing post-processing of an overall render output.

FIG. 18 illustrates schematically an example sequence of neural network processing layers 1901 for performing neural network processing 1900. Each layer of neural network processing may operate in turn, so that the output (e.g. output feature map) for a layer is used as an input (e.g. input feature map) for a next layer, until a final output (e.g. post-processed image) is generated by the last layer in the sequence. Each layer may comprise any of, for example: a convolution layer, a deconvolution layer, a pooling layer, an activation layer, a fully connected layer, or other suitable and desired neural network layer.

In embodiments where the post-processing is performed using neural network processing, at least the first layer of neural network processing is divided into a plurality of post-processing tasks (neural network processing tasks) which each process a region of the overall render output to generate a region of a post-processed output (e.g. output feature map), and which are issued before all of the rendering tasks for the rendering pass have completed their processing. In embodiments, the first layer of neural network processing which directly processes the overall render output is a convolution layer.

One or more (or all) later layers (e.g. convolutional layers) of neural network processing (corresponding to further post-processing passes) could likewise be divided into a plurality of post-processing tasks (neural network processing tasks) if desired. For example, different tasks could process different layers, and/or a layer may be split into sub-regions, with each task processing a (layer) sub-region. In an embodiment, the receptive field of the output region to be processed is determined, and a task processes the appropriate portions of each layer of the network to generate the output region.

As will be apparent from the above discussion, post-processing tasks may depend on various different rendering tasks.

In embodiments, the order in which rendering tasks are issued is controlled so as to efficiently 'feed' the post-processing tasks.

This could be done, for example, by grouping rendering tasks which a post-processing task depends on, so that they are issued in close proximity (e.g. successively) in the order of rendering tasks. For example, with reference to FIG. 5, the rendering tasks which generate regions E, F, I, J, M and N could be issued successively in the order of rendering tasks, to permit the post-processing task "i" to be issued and performed (executed).

The order in which rendering tasks are issued could also be an order in which preferentially clears the dependencies of post-processing tasks dependent on fewer rendering tasks before post-processing tasks dependent on more rendering tasks.

For example, when boundary regions are used by post-processing tasks, then post-processing tasks generating regions at the edges of the post-processed output may depend on fewer rendering tasks compared to post-processing tasks generating regions away from the edges. For example, with reference to FIG. 6, the post-processing task generating region "i" at the edge of the post-processed output may depend on six rendering tasks (generating regions E, F, I, J, M and N), whereas post-processing task generating region "f" away from the edge of the post-processed output may depend on nine post-processing tasks (generating regions E, F, G, I, J, K, M, N and O). Thus, the rendering tasks which generate regions E, F, I, J, M and N could be issued to clear the dependencies for generating region "i", before the rendering tasks which generate regions G, K, and O are issued to then clear the dependencies for generating region "j".

Other suitable and desired orders for rendering tasks to efficiently 'feed' the post-processing tasks could also be used.

Equally, an order for issuing post-processing tasks could be determined based on when post-processing tasks are likely to have their dependencies met (based on when the rendering tasks on which they depend are likely to completed their processing). For example, with reference for FIG. 5, an order for issuing post-processing tasks may include the post-processing task which generates region "i" before the post-processing task which generates region "j".

However, as discussed herein, it may be the case that some rendering tasks take longer to complete their processing (execute) than other rendering tasks. As such, it may be desirable to dynamically determine the order for post-processing tasks (for example by adapting an initially determined order for post-processing tasks, or determining the order for post-processing tasks completely on-the-fly) depending on when rendering tasks actually complete their processing (as may be tracked by scoreboard 21).

FIG. 8 shows an example scoreboard 21 for tracking the completion of rendering tasks. The scoreboard 21 comprises a plurality of indicators 27 which each indicate whether a group of one or more rendering tasks have completed their processing (in order words each indicator indicates whether a respective region of the overall render output has been generated.)

In the example shown in FIG. 8, the scoreboard has a 4×4 array of indicators 27 (which is the same as the number of regions which the render output α of FIGS. 6 and 7 is divided into). As such, each indicator 27 may directly correspond to a region of the render output α to be generated by a single rendering task (and so each indicator 27 may track whether a single rendering task has completed its processing). Each indicator 27 may be a binary indicator indicating that the region/rendering task(s) that it tracks is compete (e.g. by means of a value "1") or not complete (e.g. by means of a value "0").

In the example of FIG. 8, the rendering tasks (region of the overall output) tracked by the top left four indicators have completed (has been generated). A post-processing task dependent on one or more of those rendering tasks (only) (using a region of the render output falling solely within the region indicated by those indicators 27), will be permitted to be issued based on checking the relevant the scoreboard indicators. However, a post-processing task which depends on any other rendering tasks (which uses a region of the overall render output represented by any other indicators which indicate incomplete regions (are zero)), such as indicated by the dotted line in FIG. 8 will not yet be permitted to be issued.

Figure 9A:
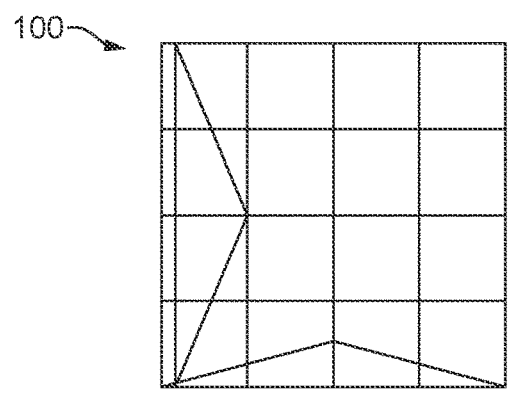
FIGS. 9*a-b* illustrate use of the scoreboard of FIG. 8 when one or more regions of the overall render output require no rendering to be performed.

It may be the case that one or more regions of the overall render output do not require any rendering to be performed (and for which no rendering task(s) will be issued), for example regions (tiles) containing no primitives. Such regions may be 'disabled' for the purpose of rendering. Which regions are 'disabled' may be indicated in a data structure, for example a "tile enable map" 100 as illustrated in FIG. 9a.

Figure 9B:
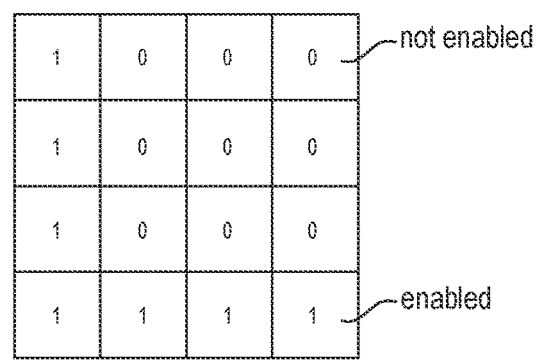

For regions which require no rendering (which are indicated as being 'disabled' in the tile enable map), the relevant indicators 27 of the scoreboard may be set to indicate those regions are complete (set to "1") in advance of performing the rendering pass, as illustrated in FIG. 9b. As a result, any post-processing tasks requiring (only) those regions of the render output will, in response to checking the scoreboard, be permitted to be issued.

Alternatively, the scoreboard may not account for the tile enable map. In this case, when a post-processing task is desired to be issued, the tile enable map 100 may be checked, and if the post-processing task uses (only) a region of the overall render output indicated as requiring no rendering (a region which is 'disabled'), then the scoreboard is not checked, and the post-processing task is issued. The checks could equally be performed in the opposite order, with the scoreboard checked first, followed by the tile enable map (so that if an indicator of the scoreboard indicates a region of the overall render output to be used by a post-processing tasks is not yet generated, it is then checked whether that region is 'disabled' in the tile enable map so as to allow the post-processing task to be issued).

Figure 10A:
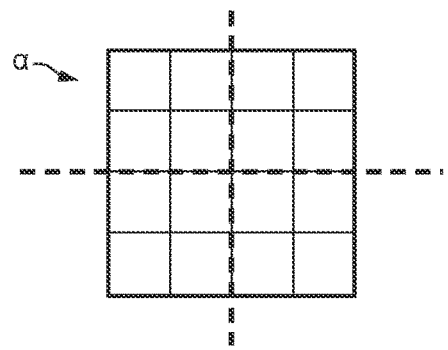
FIG. 10*a-f* illustrate use of a an example 'coarse' scoreboard having fewer entries than the number of regions (tiles) of the overall render output.
Figure 10B:
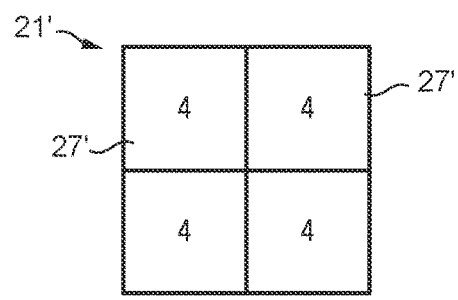

FIG. 10b shows an alternative 'coarse' scoreboard 21' comprising four indicators 27' (which each span four regions of the overall render output α generated by rendering tasks as illustrated in FIG. 10a). In this case, each indicator 27' may comprise a counter which has a maximum count corresponding to the number of rendering tasks which it tracks (in this case four), and which is decremented as the rendering tasks it tracks complete their processing, so that when the counter reaches zero (indicating that the entire region of the overall render output represented by the indicator has been generated), any post-processing task which checks that indicator (which depends on a rendering task represented by that indictor, or uses a region of the render output falling within the region represented by that indicator) is then permitted to be issued. The indicators 27' could be set in advance to their maximum count values. Alternatively, the count values could be incremented as rendering tasks are issued (and decremented as rendering tasks complete their processing).

Figure 10C:
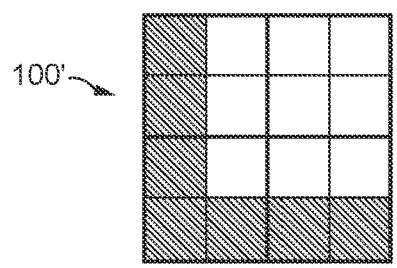
Figure 10D:
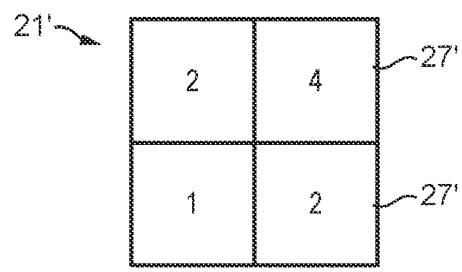

As indicated in FIG. 10d, the maximum values of the indicators 27' of the scoreboard 21' may depend on whether any regions of the render output are 'disabled' for rendering (as indicated in tile enable map data 100' such as shown in FIG. 10c). For example, since two of the regions represented by the upper left indicator 27' of FIG. 10d are 'disabled', the maximum count is reduced by two, to two. None of the regions represented by the upper right indicator 27' of FIG. 10d are 'disabled', and so the maximum count is not reduced and is four.

Figure 10E:
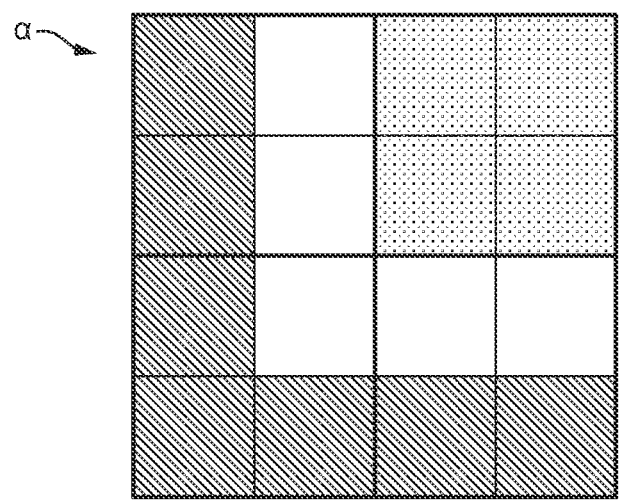
Figure 10F:
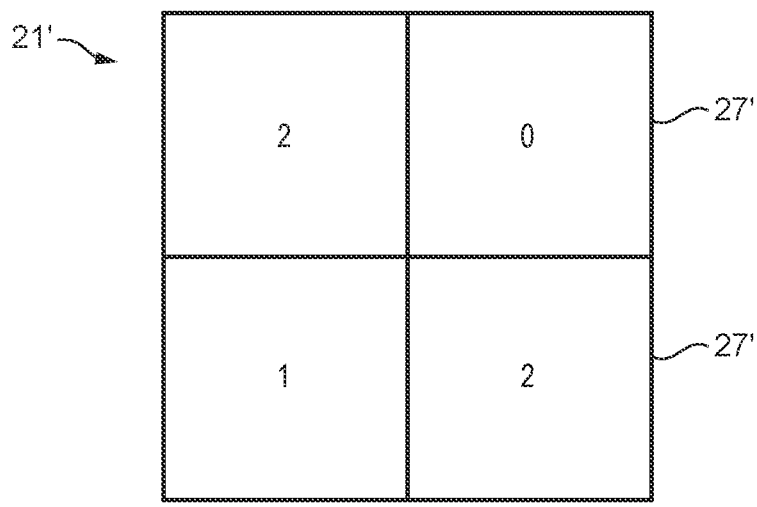

FIG. 10f shows example counts of the indicators 27' of the coarse scoreboard 21' of FIG. 10d once the upper right four regions of the overall render output have been generated (as illustrated in FIG. 10e). In this case, the top right indicator has been decremented by four and is now zero, so that any post-processing tasks checking that indicator only will be permitted to be issued.

Figure 11:
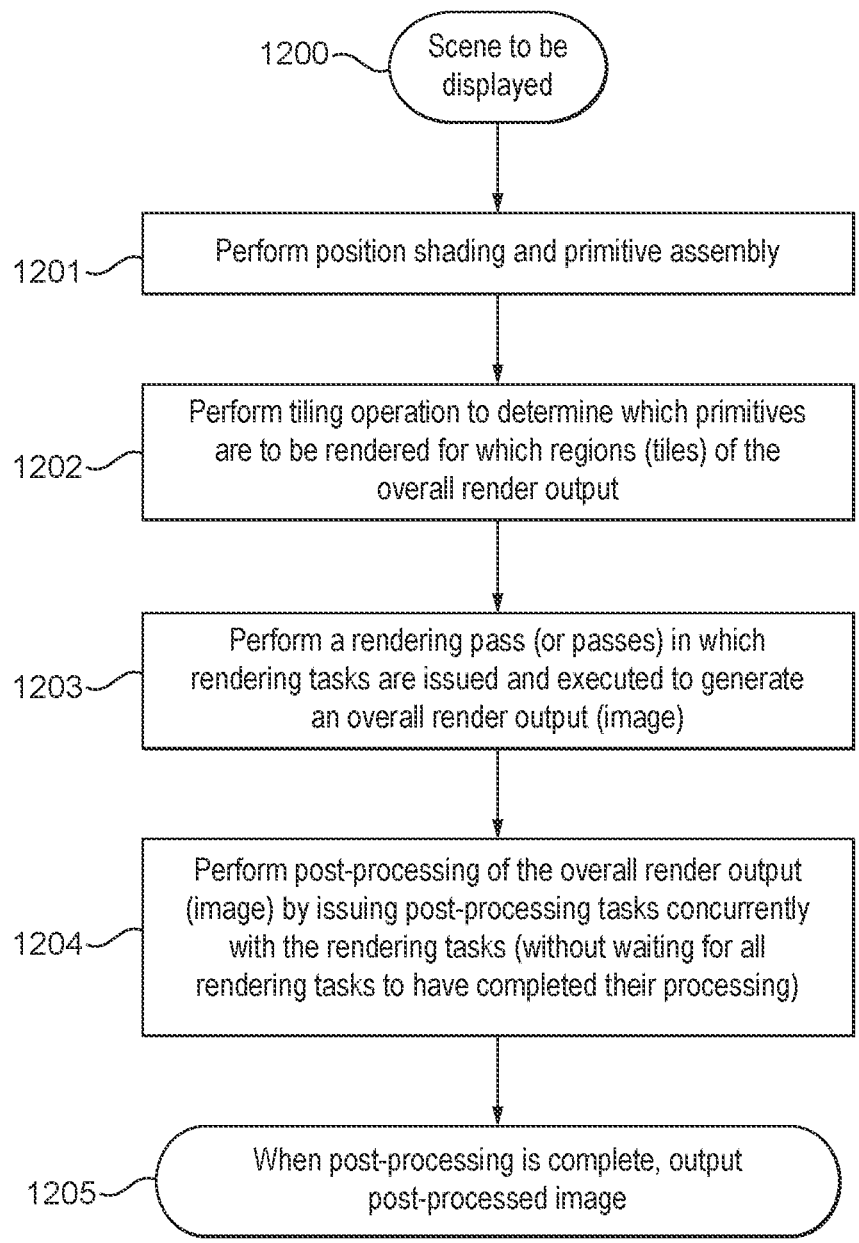
FIG. 11 is a flowchart showing steps for performing graphics processing in embodiments of the technology described herein.

FIG. 11 is a flowchart showing steps for performing rendering and post-processing in embodiments of the technology described herein.

As shown in FIG. 11, for a scene to be displayed (at step 1200), position shading for vertices of primitives in the scene to be displayed, and assembling the vertices into primitives, may be performed (step 1201), followed by tiling to determine which primitives should be rendered for regions (tiles) of the overall render output (step 1202).

Then when performing rendering, one or more rendering passes are performed in which rendering tasks are issued and executed to generate (by the final rendering pass) an overall render output (image) (step 1202). The rendering may, e.g., involve rasterising primitives, ray-tracing, and/or hybrid ray-tracing, as desired.

Post-processing of the overall render output is also performed (step 1203) by issuing post-processing tasks without waiting for all rendering tasks to have completed their processing (e.g. interleaved with rendering tasks). The post-processing may comprise one or more post-processing passes. When post-processing is complete (step 1205), a post-processed image is output, e.g. for display.

As discussed above, post-processing tasks may be issued when it is determined that the rendering tasks on which they depend have completed their processing (by checking a 'task completion status' data structure, such as a scoreboard).

Figure 12:
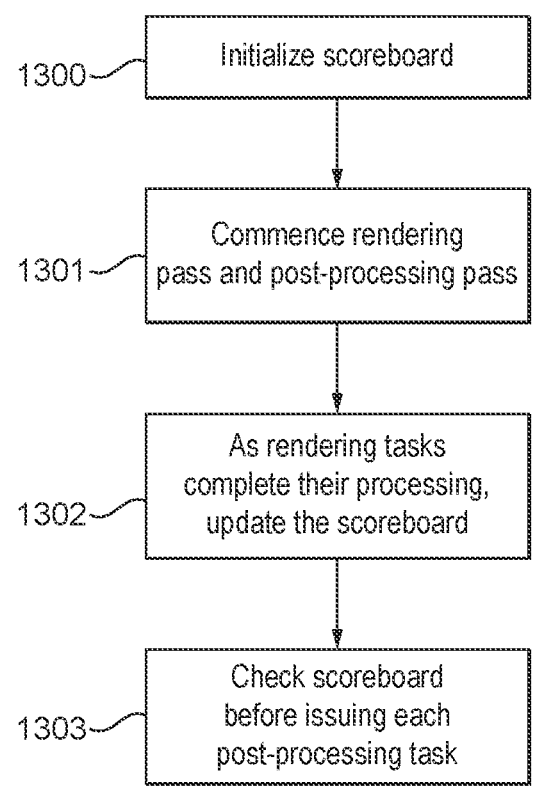
FIG. 12 is a flowchart showing steps for performing graphics processing in embodiments of the technology described herein when a scoreboard is used.

FIG. 12 shows steps for maintaining and using a task completion status data structure (e.g. scoreboard) in embodiments of the technology described herein.

The scoreboard may be initialised as appropriate, when it is desired to perform graphics processing in the manner of the technology described herein (step 1300), for example by setting any indicators for regions which are 'disabled' according to the tile enable map. The initialisation could also comprise any suitable and desired steps for recording which regions of the overall render output the indicators of the scoreboard represent (which rendering tasks the indicators track).

The rendering and post-processing passes may then be performed (step 1301). As rendering tasks complete their processing (execution by processing cores), the scoreboard is updated (step 1302), as discussed above by updating the indicator(s) which track the rendering task(s) (are relevant to the region of the overall render output generated by rendering tasks(s)).

Then when issuing post-processing tasks (step 1303), the scoreboard is checked before issuing each post-processing task, as discussed by checking the indicator(s) which track the rendering task(s) on which the post-processing task depends (which relate to the region of the overall render to be used by the post-processing task), and only issuing the post-processing task if the indicator(s) checked indicate that the rendering tasks are complete (that the region has been generated).

Regarding the order in which post-processing tasks are issued, as discussed above, an initial order may be determined based on the order in which rendering tasks are expected to have completed their processing (execution).

Figure 13:
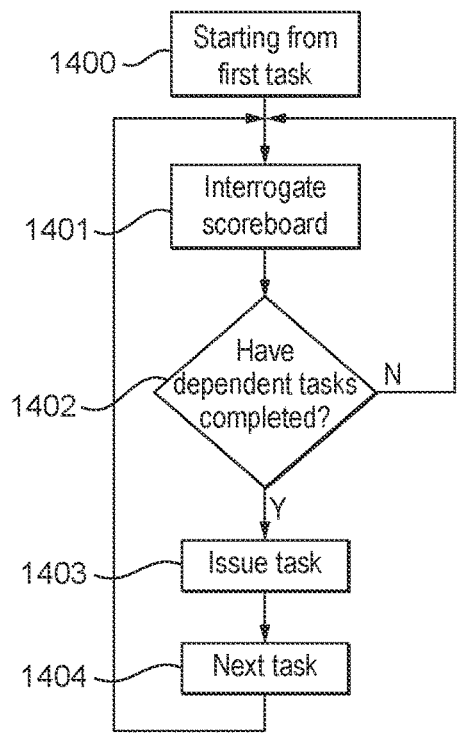
FIGS. 13 and 14 are flowcharts showing steps for issuing post-processing tasks in embodiments of the technology described herein.

FIG. 13 is a flowchart showing steps for issuing post-processing tasks in an initially determined order for post-processing tasks. Starting from a first task in the initially determined order for post-processing tasks (step 1400), the scoreboard is checked (step 1401), and if the scoreboard indicates that the rendering tasks on which the post-processing task depends have completed their processing (step 1402) then the task is issued (step 1403) and the next post-processing task in the order is considered (step 1404). However, if the scoreboard indicates that the rendering tasks on which the post-processing task depends have not completed their processing (at step 1402) then the post-processing task is not issued and the scoreboard is then checked again (e.g. periodically) to determine when the post-processing task can be issued.

Figure 14:
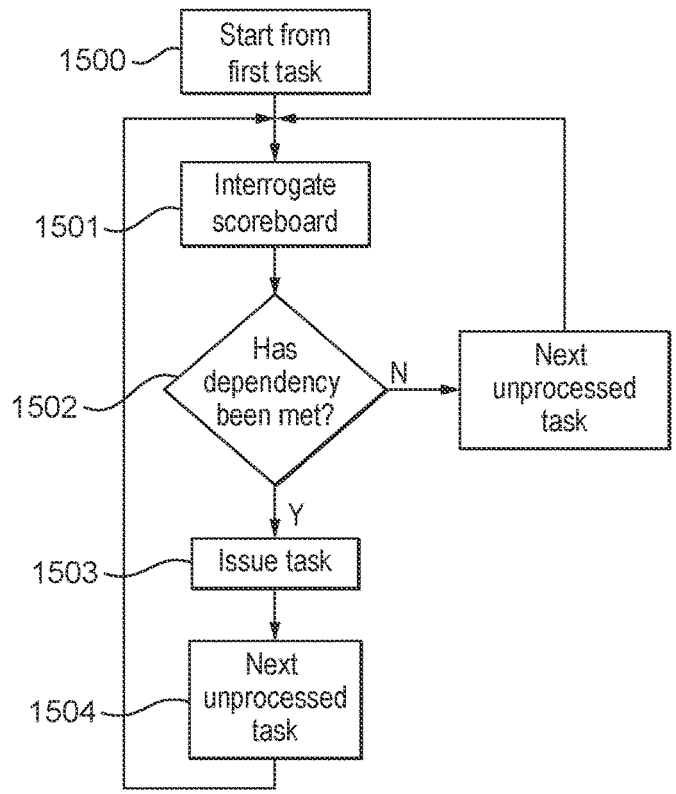

Alternatively, the order for post-processing tasks could be dynamically adjusted based on which rendering tasks have completed their processing. FIG. 14 is a flowchart showing example steps for this. Starting from a first task in the order for post-processing tasks (step 1500), the scoreboard is checked (step 1501), and if the scoreboard indicates that the rendering tasks on which the post-processing task depends have completed their processing (step 1502) then the post-processing task is issued (step 1503) and the next post-processing task is considered (step 1504). However, if the scoreboard indicates that the rendering tasks on which the post-processing task depends have not completed their processing (at step 1502) then the post-processing task is not issued and the next post-processing task in the order is considered (step 1505).

When issuing post-processing tasks to processing core(s), in embodiments, the processing core to which a post-processing task is issued is determined based on whether that processing core might have data stored locally (e.g. in level 1 cache, or the tile buffer) which the post-processing task requires for its processing use.

Figure 15:
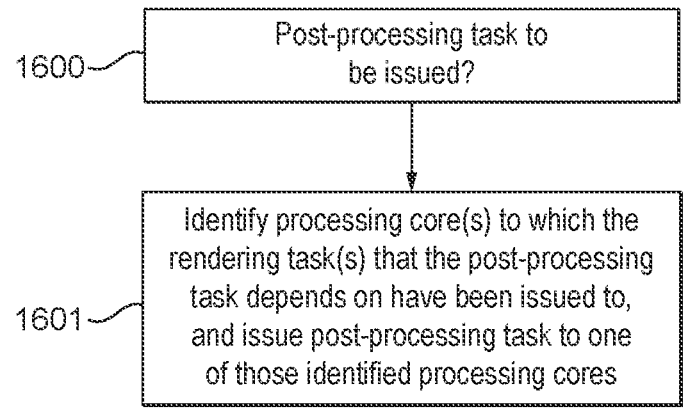
FIG. 15 is a flowchart showing steps for determining which processing core(s) to issue post-processing tasks to in embodiments of the technology described herein.

This may be done as shown in the flowchart of FIG. 15 in which, when a post-processing task is to be issued (step 1600) (when its dependencies have been determined to be met by checking the scoreboard), then (step 1601) processing core(s) are identified which the rendering task(s) that the post-processing task depends on have been issued to, and the post-processing task is issued to one of those identified processing cores. In this way, the post-processing task will hopefully be able to obtain from local storage of the processing core at least some of the data for the region of the overall render output which it is to process (provided it has not yet been overwritten).

Alternatively, or additionally, post-processing task(s) could be issued to processing core(s) to which post-processing tasks generating adjacent regions of the post-processed output have been issued. In this regard, post-processing task(s) generating adjacent regions may use at least some of the same data (e.g. using a same weight data array (filter), or overlapping region(s) of the overall render output) which may be able to be re-used from local memory by the post-processing task.

Figure 16:
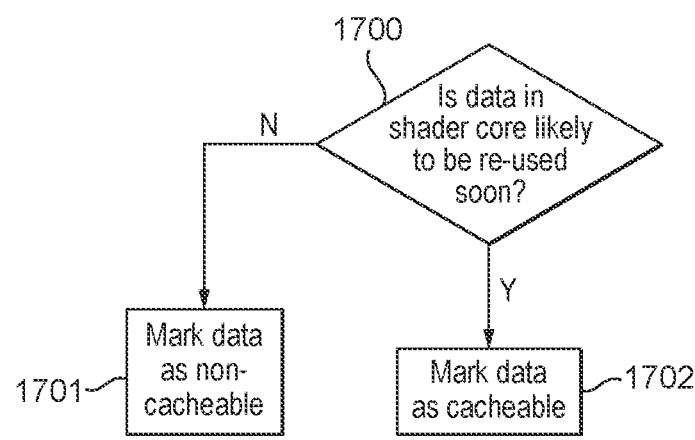
FIG. 16 is a flowchart showing steps for determining whether to store render output data locally.

In embodiments, post-processing tasks, where possible, when executing, access data required to be processed from local storage to reduce memory bandwidth associated with retrieving data from main memory 9. To assist with this, in embodiments, regions of the overall render output generated by rendering tasks (instead of being written directly from the tile buffer 13 to main memory 9 as may be done when performing rendering without post-processing), are written to local storage (are cached locally) (for example within the graphics processor, e.g. in the level 2 cache 4). FIG. 16 is a flowchart illustrating this process.

At step 1700, it is determined whether the system is operating in the manner of the technology described herein (in which post-processing tasks are issued without waiting for all of the rendering tasks to complete their processing, and so in which data generated when executing rendering tasks is likely to be re-used soon by post-processing tasks), and if so data generated when executing rendering tasks is marked as cacheable (step 1702) and is written to local storage (e.g. level 2 cache 4). If the system is not permitting post-processing tasks to be issued before all of the rendering tasks complete their processing (so that data generated when executing rendering tasks is not likely to be re-used soon), then the data generated when executing rendering tasks is marked as non-cacheable (step 1702) and is written from the tile buffer 13 directly to main memory 9.

As will be apparent from the above discussion, the technology described herein provides methods and systems for performing rendering followed by post-processing which can help to efficiently perform processing and reduce memory bandwidth.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when performing graphics processing comprising a sequence of processing passes, the graphics processor including a set of one or more processing cores, the method comprising:
when performing a sequence of processing passes comprising a render pass and a post-processing pass, the render pass comprising a set of plural rendering tasks to be processed to generate an overall output for the render pass, and the post-processing pass comprising a set of plural post-processing tasks that use the overall output of the render pass:
issuing rendering tasks for the render pass to the one or more processing cores of the graphics processor for processing, the rendering tasks when executed generating respective sub-regions of the overall output for the render pass; and
issuing post-processing tasks to the one or more processing cores of the graphics processor for processing, the post-processing tasks when executed generating respective sub-regions of a post-processed output for the post-processing pass;
wherein the post-processing tasks are issued to the one more processing cores without waiting for processing for all of the rendering tasks for the render pass to have completed, such that post-processing tasks are interleaved with and processed concurrently with rendering tasks.

2. The method of claim 1, comprising
controlling an order of issuing rendering tasks based on dependencies of post-processing tasks upon rendering tasks.

3. The method of claim 1, comprising only issuing a post-processing task once the processing for the rendering task or tasks on which said post-processing task depends has or is likely to have completed.

4. The method of claim 1, comprising tracking the completion of rendering tasks, and controlling the order of issuing post-processing tasks based on the tracking of the completion of rendering tasks.

5. The method of claim 1, comprising storing regions of the overall render output generated by respective rendering tasks within local storage of the graphics processor, for use by post-processing tasks.

6. The method of claim 1, comprising issuing a post-processing task to the same processing core as one or more of the rendering tasks which said post-processing task depends on were issued to.

7. The method of claim 1, comprising issuing one or more post-processing tasks which require at least some data that is the same to the same processing core.

8. The method of claim 1, comprising issuing one or more combined tasks, each combined task comprising a rendering task and a post-processing task which are issued together to the same processing core.

9. The method of claim 1, wherein post-processing tasks for the post-processing pass comprise neural network processing tasks.

10. A graphics processor comprising:
a set of one or more processing cores;
a task issuing circuit operable to control the issuing of tasks to the one or more processing cores for processing; and
wherein the task issuing circuit is configured to:
when the graphics processor is performing a sequence of processing passes comprising a render pass and a post-processing pass,
the render pass comprising a set of plural rendering tasks to be processed to generate an overall output for the render pass, the rendering tasks when executed generating respective sub-regions of the overall output for the render pass, and
the post-processing pass comprising a set of plural post-processing tasks that use the overall output of the render pass, the post-processing tasks when executed generating respective sub-regions of a post-processed output for the post-processing pass:
start issuing post-processing tasks without waiting for processing for all of the rendering tasks for the render pass to have completed, such that post-processing tasks are interleaved and can be processed concurrently with rendering tasks.

11. The graphics processor of claim 10, wherein the task issuing circuit is configured to at least one of:
control an order of issuing post-processing tasks based on dependencies of post-processing tasks upon rendering tasks; and
control an order of issuing rendering tasks based on dependencies of post-processing tasks upon rendering tasks.

12. The graphics processor of claim 10, wherein the task issuing circuit is configured to issue rendering tasks in a predetermined, static order.

13. The graphics processor of claim 10, wherein the task issuing circuit is configured to issue a post-processing task only once the processing for the rendering task or tasks on which it depends has or is likely to have completed.

14. The graphics processor of claim 10, wherein the task issuing circuit is configured to track the completion of rendering tasks, and control the order of issuing post-processing tasks based on the tracking of the completion of rendering tasks.

15. The graphics processor of claim 10, further configured to store regions of the overall render output generated by respective rendering tasks within local storage of the graphics processor, for use by post-processing tasks.

16. The graphics processor of claim 10, wherein the task issuing circuit is configured to issue a post-processing task to the same processing core as one or more of the rendering tasks which said post-processing task depends on were issued to.

17. The graphics processor of claim 10, wherein the task issuing circuit is configured to issue one or more post-processing tasks which require at least some data that is the same to the same processing core.

18. The graphics processor of claim 10, wherein the task issuing circuit is configured to issue one or more combined tasks, each combined task comprising a rendering task and a post-processing task which are issued together to the same processing core.

19. The graphics processor of claim 10, wherein the post-processing tasks for the post-processing pass comprise neural network processing tasks.

20. A non-transitory computer readable storage medium storing computer software code which when executing on at least one processor performs a method of operating a graphics processor when performing graphics processing comprising a sequence of processing passes, the graphics processor including a set of one or more processing cores, the method comprising:

when performing a sequence of processing passes comprising a render pass and a post-processing pass, the render pass comprising a set of plural rendering tasks to be processed to generate an overall output for the render pass, and the post-processing pass comprising a set of plural post-processing tasks that use the overall output of the render pass:

issuing rendering tasks for the render pass to the one or more processing cores of the graphics processor for processing, the rendering tasks when executed generating respective sub-regions of the overall output for the render pass; and issuing post-processing tasks to the one or more processing cores of the graphics processor for processing, the post-processing tasks when executed generating respective sub-regions of a post-processed output for the post-processing pass;

wherein the post-processing tasks are issued to the one more processing cores without waiting for processing for all of the rendering tasks for the render pass to have completed, such that post-processing tasks are interleaved with and processed concurrently with rendering tasks.

* * * * *